(12) United States Patent
Ge et al.

(10) Patent No.: US 12,376,091 B2
(45) Date of Patent: Jul. 29, 2025

(54) METHOD FOR INDICATING CHANNEL STATE INFORMATION CSI MEASUREMENT AND COMMUNICATION APPARATUS

(71) Applicant: HUAWEI TECHNOLOGIES CO., LTD., Shenzhen (CN)

(72) Inventors: Shibin Ge, Shanghai (CN); Zhimeng Zhong, Moscow (RU); Xiaohan Wang, Shanghai (CN); Huangping Jin, Shanghai (CN); Li Fan, Shanghai (CN); Xiaoyan Bi, Ottawa (CA); Yiling Yuan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 417 days.

(21) Appl. No.: 17/941,430

(22) Filed: Sep. 9, 2022

(65) Prior Publication Data

US 2023/0013510 A1 Jan. 19, 2023

Related U.S. Application Data

(63) Continuation of application No. PCT/CN2020/079317, filed on Mar. 13, 2020.

(51) Int. Cl.
*H04W 4/00* (2018.01)
*H04W 72/0453* (2023.01)

(52) U.S. Cl.
CPC .............. *H04W 72/0453* (2013.01)

(58) Field of Classification Search
USPC ................................. 370/329, 330
See application file for complete search history.

(56) References Cited

U.S. PATENT DOCUMENTS

2019/0230549 A1* 7/2019 Wang .................. H04B 7/0639
2021/0068015 A1* 3/2021 Yang .................... H04W 36/38
(Continued)

FOREIGN PATENT DOCUMENTS

CN 106559879 A 4/2017
CN 107911203 A 4/2018
(Continued)

OTHER PUBLICATIONS

Huawei, HiSilicon, On CSI-RS measurement capability. 3GPP TSG-RAN WG4 Meeting #94-e, Online, Feb. 24-Mar. 6, 2020, R4-2001647, 4 pages.
(Continued)

*Primary Examiner* — Chuong T Ho
(74) *Attorney, Agent, or Firm* — HAUPTMAN HAM, LLP

(57) ABSTRACT

A method for indicating channel state information CSI measurement and a communication apparatus. A network device indicates, to a terminal device by using first indication information, one or more frequency domain units in a downlink reference signal resource that are used by the terminal device to obtain CSI. The terminal device determines, based on the first indication information, which frequency domain units in the downlink reference signal resource are used to obtain the CSI, and perform measurement in the frequency domain unit to obtain the CSI. The network device flexibly configures CSI measurement based on a system status, to control obtaining of the CSI. This helps the terminal device obtain the CSI more pertinently based on the indication in different cases.

20 Claims, 4 Drawing Sheets

(56) References Cited

U.S. PATENT DOCUMENTS

| | | | | |
|---|---|---|---|---|
| 2021/0320703 A1* | 10/2021 | Choi | ................... | H04B 7/0636 |
| 2022/0159523 A1* | 5/2022 | Xu | ................... | H04W 36/0072 |
| 2022/0303812 A1* | 9/2022 | Chung | ................. | H04L 5/0053 |
| 2022/0303999 A1* | 9/2022 | Chung | ................ | H04W 72/542 |

FOREIGN PATENT DOCUMENTS

| | | |
|---|---|---|
| EP | 3471332 A1 | 4/2019 |
| EP | 3579480 A1 | 12/2019 |
| WO | 2017171630 A1 | 10/2017 |

OTHER PUBLICATIONS

3GPP TS 38.214 V16.0.0 (Dec. 2019), 3rd Generation Partnership Project; Technical Specification Group Radio Access Network; NR; Physical layer procedures for data(Release 16), 147 pages.

Extended European Search Report issued in corresponding European Application No. 20923965.6, dated Mar. 14, 2023, pp. 1-13.

Huawei, HiSilicon, Remaining issues on CSI-RS #2. 3GPP TSG RAN WG1 Meeting #92bis, Sanya, China, Apr. 16 20, 2018, R1-1805685, 10 pages.

International Search Report issued in corresponding International Application No. PCT/CN2020/079317, mailed Dec. 10, 2020, pp. 1-9.

* cited by examiner

METHOD FOR INDICATING CHANNEL STATE INFORMATION CSI MEASUREMENT AND COMMUNICATION APPARATUS

CROSS-REFERENCE TO RELATED APPLICATIONS

This application is a continuation of International Application No. PCT/CN2020/079317, filed on Mar. 13, 2020, the disclosure of which is hereby incorporated by reference in its entirety.

BACKGROUND

In a massive multiple-input multiple-output (massive multiple-input multiple-output, Massive MIMO) technology, for example, a network device may reduce interference between a plurality of users and interference between a plurality of signal flows of a same user by using a precoding technology, to improve signal quality, implement spatial multiplexing, and improve spectrum utilization. Therefore, it is quite important to obtain at least one type of channel state information (channel state information, CSI) such as a precoding matrix indicator (precoding matrix indicator, PMI) or a channel quality indicator (channel quality indicator, CQI).

For example, a terminal device may determine a precoding matrix based on downlink channel measurement, and expects to enable, through feedback, the network device to obtain a precoding matrix that is the same as or similar to the precoding matrix determined by the terminal device. Specifically, for example, the terminal device may feed back one or more space domain vectors, one or more frequency domain vectors, and one or more weighting coefficients, to indicate to construct the precoding matrix.

In a beamforming (beamforming) technology, a network device sends corresponding downlink reference signals, for example, channel state information reference signals (channel state information reference signals, CSI-RSs), to different user equipments (user equipments, UEs) to perform channel measurement, and obtains CSI that is obtained by the UE through measurement, to reconstruct a downlink channel or perform precoding. However, when a base station needs to obtain CSI from a large quantity of UEs, communication overheads are very high, and flexible control cannot be achieved, affecting performance of a CSI obtaining solution.

SUMMARY

A method for indicating channel state information CSI measurement and a communication apparatus, to flexibly control CSI measurement are described herein.

According to a first aspect, a method for indicating channel state information CSI measurement is provided. The method is performed by a terminal device or a component (for example, a chip or a chip system) configured in the terminal device.

Specifically, the method includes: receiving first indication information, where the first indication information indicates one or more frequency domain units in a downlink reference signal resource that are used by the terminal device to obtain CSI; and performing measurement in the frequency domain unit based on the first indication information to obtain the CSI.

Based on the foregoing technical solution, a network device flexibly configures CSI measurement based on a system status (for example, a reference signal port, a system bandwidth, a scheduled bandwidth, a measurement bandwidth, resource utilization, or transmission power), to control obtaining of the CSI. This helps the terminal device obtain the CSI more pertinently based on the indication in different cases.

The performing measurement in the frequency domain unit to obtain the CSI is as follows: The terminal device adds up measurement results in the frequency domain units for obtaining the CSI, to obtain the CSI. Alternatively, the terminal device performs fast Fourier transform (Fast Fourier Transform, FFT) or inverse fast Fourier transform (Inverse Fast Fourier Transform, IFFT) on the frequency domain unit, and selects a direct current component, to obtain the CSI. Specifically, the terminal device performs channel estimation based on the indication from the network device and a received CSI-RS, then performs IFFT/FFT on a channel estimation result corresponding to the frequency domain unit, and finally selects, as a measurement result, an $n^{th}$ point obtained through the IFFT/FFT, for example, selects a $0^{th}$ point (namely, the direct current component) as the measurement result. Alternatively, other processing is performed. This is not limited in embodiments described herein, and any technical solution to performing measurement in the indicated frequency domain unit to obtain the CSI falls within the protection scope of embodiments described herein.

According to a second aspect, a method for indicating channel state information CSI measurement is provided. For example, the method is performed by a network device or a component (for example, a chip or a chip system) configured in the network device.

Specifically, the method includes: generating first indication information, where the first indication information indicates one or more frequency domain units in a downlink reference signal resource that are used by a terminal device to obtain CSI; and sending the first indication information.

Based on the foregoing technical solution, the network device flexibly configures CSI measurement based on a system status (for example, a reference signal port, a system bandwidth, a scheduled bandwidth, a measurement bandwidth, resource utilization, or transmission power), to control obtaining of the CSI. This helps the terminal device obtain the CSI more pertinently based on the indication in different cases.

With reference to the first aspect or the second aspect, in at least one embodiment, the first indication information includes second indication information, indicating a start frequency domain unit in the frequency domain units. The start frequency domain unit in the frequency domain units used by the terminal device to obtain the CSI is determined based on the indication by the second indication information. The start frequency domain unit is indicated by using a position or an identifier of the start frequency domain unit. The position of the start frequency domain unit is a relative position of the start frequency domain unit in the downlink reference signal resource, or is an absolute position of the start frequency domain unit in a system. The identifier of the start frequency domain unit is a relative identifier of the start frequency domain unit in the downlink reference signal resource, or is an absolute identifier of the start frequency domain unit in the system.

With reference to the first aspect or the second aspect, in at least one embodiment, distribution density, in the downlink reference signal resource, of the frequency domain units used by the terminal device to obtain the CSI is preset as distribution at an interval of P frequency domain units, where P is an integer greater than or equal to 0. In response to the distribution density, in the downlink reference signal resource, of the frequency domain units used by the terminal device to obtain the CSI being predetermined, not only the start frequency domain unit but also a remaining frequency domain unit in the frequency domain units used by the terminal device to obtain the CSI is determined based on the indication by the second indication information.

With reference to the first aspect or the second aspect, in at least one embodiment, the first indication information further includes third indication information, indicating distribution density of the frequency domain units in the downlink reference signal resource. The distribution density is alternatively flexibly configured by using the indication, and not only the start frequency domain unit but also a remaining frequency domain unit in the frequency domain units used by the terminal device to obtain the CSI is determined based on the indication by the third indication information.

With reference to the first aspect or the second aspect, in at least one embodiment, the first indication information includes fourth indication information, indicating a quantity of frequency domain unit groups into which the frequency domain units are grouped.

With reference to the first aspect or the second aspect, in at least one embodiment, the frequency domain unit groups correspond to different downlink reference signal ports. The quantity of frequency domain unit groups in the downlink reference signal resource that are used by the terminal device to obtain the CSI is determined by using the fourth indication information. As the frequency domain unit groups correspond to the different downlink reference signal ports, a quantity of groups into which the downlink reference signal ports are grouped is determined.

With reference to the first aspect or the second aspect, in at least one embodiment, the frequency domain unit groups correspond to a same downlink reference signal port.

With reference to the first aspect or the second aspect, in at least one embodiment, the frequency domain unit groups correspond to different downlink reference signal ports, and a correspondence between the frequency domain unit groups and the different downlink reference signal ports is preset or is indicated by fifth indication information included in the first indication information. the correspondence between the frequency domain unit groups and the different downlink reference signal ports is preset, for example, predefined in a protocol, or is flexibly configured.

With reference to the first aspect or the second aspect, in at least one embodiment, the first indication information further includes sixth indication information, indicating a start frequency domain unit of the first group in the frequency domain unit groups. In response to grouping into the frequency domain unit group used by a user to obtain the CSI not always starting from the first frequency domain unit in all frequency domain units in the downlink reference signal resource, a frequency domain position of the frequency domain unit group for obtaining the CSI is flexibly configured based on the indication by the sixth indication information.

With reference to the first aspect or the second aspect, in at least one embodiment, distribution density, in the downlink reference signal resource, of the frequency domain units of each frequency domain unit group is preset as distribution at an interval of P frequency domain units, where P is an integer greater than or equal to 0. In response to P=0, the distribution density, in the downlink reference signal resource, of the frequency domain units for obtaining the CSI is preset as distribution without intervals, and the frequency domain units of each frequency domain unit group are determined to be adjacent to each other in the downlink reference signal resource. In response to the distribution density being preset as the distribution at the interval of P frequency domain units, assuming that P=1, one frequency domain unit is determined to exist between every two frequency domain units of each frequency domain unit group in the downlink reference signal resource.

With reference to the first aspect or the second aspect, in at least one embodiment, the first indication information further includes seventh indication information, indicating a start frequency domain unit of a group other than the first group in the frequency domain unit groups; or a start frequency domain unit of a group other than the first group in the frequency domain unit groups is preset to satisfy a predetermined condition. The start frequency domain unit of the remaining group is indicated by signaling, or is predefined.

With reference to the first aspect or the second aspect, in at least one embodiment, the predetermined condition is:

$$(G_i+R_0) \bmod M$$

where $G_i$ is a group number of the frequency domain unit group, where i=0, 1, 2, ..., or M; $R_0$ is a frequency domain unit identifier of the start frequency domain unit of the first group in the frequency domain unit groups; M is the quantity of frequency domain unit groups; and mod indicates obtaining a remainder of $(G_i+R_0)$ divided by M. A unit identifier of the start frequency domain unit of the remaining group is determined by using the foregoing predetermined condition, so that the start frequency domain unit of the remaining group is determined.

In comparison with directly indicating each frequency domain unit by using a different value of a corresponding field, indication overheads is reduced to some extent in all the foregoing indication manners.

With reference to the first aspect or the second aspect, in at least one embodiment, the first indication information indicates the frequency domain unit by indicating an identifier or a position of the frequency domain unit. The frequency domain unit that is in the downlink reference signal resource and that is used by the terminal device to obtain the CSI is directly indicated without regard to indication overheads.

With reference to the first aspect or the second aspect, in at least one embodiment, the first indication information includes at least one of the following: indication information indicating the measurement bandwidth, indication information indicating a quantity of downlink reference signal ports, or a CSI obtaining solution based on angle-delay reciprocity. The frequency domain unit that is in the downlink reference signal resource and that is used by the terminal device to obtain the CSI is implicitly indicated by at least one of these pieces of information in the first indication information.

With reference to the first aspect or the second aspect, in at least one embodiment, at least one of the following is preset or is indicated by ninth indication information: a correspondence between the measurement bandwidth and a quantity of frequency domain unit groups into which the frequency domain units are grouped; a correspondence between the measurement bandwidth and distribution density of the frequency domain units; a correspondence between the quantity of downlink reference signal ports and a quantity of frequency domain unit groups; a correspondence between the quantity of downlink reference signal ports and distribution density of the frequency domain units; a start frequency domain unit of the first group; a start frequency domain unit of a group other than the first group; distribution density of each frequency domain unit group; distribution density of the frequency domain units; or a start frequency domain unit in the frequency domain units.

With reference to the first aspect or the second aspect, in at least one embodiment, the frequency domain unit is a resource block RB, a subband, a subcarrier, or a bandwidth part BWP. The frequency domain unit is defined from different perspectives or in different units.

With reference to the first aspect or the second aspect, in at least one embodiment, the first indication information is carried in a subband reporting configuration CSI-ReportingBand. The first indication information is sent by using a newly defined field, or is sent by reusing an existing field, where interpretation of different values of the field is redefined.

The first indication information is delivered by using one piece of signaling, or is delivered by using a plurality of pieces of signaling, to be specific, the second indication information, the third indication information, the fourth indication information, the fifth indication information, the sixth indication information, and the seventh indication information that are included in the first indication information are carried in a plurality of pieces of signaling.

The first indication information, the second indication information, the third indication information, the fourth indication information, the fifth indication information, the sixth indication information, and the seventh indication information is same indication information or different indication information. In other words, to-be-indicated information is jointly indicated or is separately indicated.

The first indication information is carried in at least one of the following: a radio resource control (radio resource control, RRC) message, a media access control (media access control, MAC) control element (control element, CE), and downlink control information (downlink control information, DCI). The enumerated signaling is merely examples, and does not constitute any limitation on embodiments described herein. Specific signaling carrying the first indication information is not limited in embodiments described herein.

According to a third aspect, a communication apparatus is provided. The communication apparatus includes modules or units configured to perform the method in at least one embodiment of the first aspect, for example, includes a processing unit and a transceiver unit.

According to a fourth aspect, a communication apparatus is provided. The communication apparatus includes a processor. The processor is coupled to a memory, and is configured to execute instructions in the memory, to implement the method in at least one embodiment of the first aspect. Optionally, the communication apparatus further includes the memory. Optionally, the communication apparatus further includes a communication interface, and the processor is coupled to the communication interface.

In an implementation, the communication apparatus is a terminal device. In response to the communication apparatus being the terminal device, the communication interface is a transceiver or an input/output interface. Optionally, the transceiver is a transceiver circuit, a receiver, a receiver circuit, a transmitter, a transmitter circuit, or the like. Optionally, the input/output interface is an input/output circuit.

In another implementation, the communication apparatus is a chip configured in a terminal device. In response to the communication apparatus being the chip configured in the terminal device, the communication interface is an input/output interface, an input/output circuit, an input/output pin, or the like, and the processor is a processing circuit, a logic circuit, or the like.

According to a fifth aspect, a communication apparatus is provided. The communication apparatus includes modules or units configured to perform the method in at least one embodiment of the second aspect, for example, includes a processing unit and a transceiver unit.

According to a sixth aspect, a communication apparatus is provided. The communication apparatus includes a processor. The processor is coupled to a memory, and is configured to execute instructions in the memory, to implement the method in at least one embodiment of the second aspect. Optionally, the communication apparatus further includes the memory. Optionally, the communication apparatus further includes a communication interface, and the processor is coupled to the communication interface.

In an implementation, the communication apparatus is a terminal device. In response to the communication apparatus being the terminal device, the communication interface is a transceiver or an input/output interface. Optionally, the transceiver is a transceiver circuit, a receiver, a receiver circuit, a transmitter, a transmitter circuit, or the like. Optionally, the input/output interface is an input/output circuit.

In another implementation, the communication apparatus is a chip configured in a terminal device. In response to the communication apparatus being the chip configured in the terminal device, the communication interface is an input/output interface, an input/output circuit, an input/output pin, or the like, and the processor is a processing circuit, a logic circuit, or the like.

According to a seventh aspect, a processor is provided. The processor includes an input circuit, an output circuit, and a processing circuit. The processing circuit is configured to: receive a signal through the input circuit, and transmit a signal through the output circuit, so that the processor performs the method in any possible implementation of the first aspect and the second aspect.

In at least one embodiment, the processor is one or more chips, the input circuit is an input pin, the output circuit is an output pin, and the processing circuit is a transistor, a gate circuit, a trigger, any logic circuit, or the like. By way of example but not limitation, an input signal received by the input circuit is received and input by a receiver, and a signal output by the output circuit is output to a transmitter and transmitted by the transmitter. The input circuit and the output circuit is a same circuit, where the circuit is separately used as the input circuit and the output circuit at different moments. Specific implementations of the processor and the circuits are not limited in at least one embodiment.

According to an eighth aspect, a processing apparatus is provided. The processing apparatus includes a processor and a memory. The processor is configured to read instructions stored in the memory, and receives a signal through a receiver, and transmit a signal through a transmitter, to perform the method in at least one embodiment of the first aspect and the second aspect.

Optionally, there are one or more processors and one or more memories.

Optionally, the memory is integrated with the processor, or the memory and the processor are separately configured.

In a specific implementation process, the memory is a non-transitory (non-transitory) memory, for example, a read-only memory (read-only memory, ROM). The memory and the processor is integrated on a same chip, or is separately configured on different chips. A type of the memory and a manner of configuring the memory and the processor are not limited in at least one embodiment.

A related data exchange process, for example, an indication information sending process, is a process of outputting the indication information from the processor, and a capability information receiving process is a process of receiving the input capability information by the processor. Specifically, data output by the processor is output to the transmitter, and input data received by the processor is from the receiver. The transmitter and the receiver is collectively referred to as a transceiver.

The processing apparatus in the eighth aspect is one or more chips. The processor in the processing apparatus is implemented by hardware, or is implemented by software. In response to the processor being implemented by hardware, the processor is a logic circuit, an integrated circuit, or the like. In response to the processor being implemented by software, the processor is a general-purpose processor, and is implemented by reading software code stored in the memory. The memory is integrated into the processor, or is located outside the processor and exist independently.

According to a ninth aspect, a computer program product is provided. The computer program product includes a computer program (which may also be referred to as code or instructions). In response to the computer program being run, a computer is enabled to perform the method in at least one embodiment of the first aspect and the second aspect.

According to a tenth aspect, a computer-readable medium is provided. The computer-readable medium stores a computer program (which is also referred to as code or instructions). In response to the computer program being run on a computer, the computer is enabled to perform the method in at least one embodiment of the first aspect and the second aspect.

According to an eleventh aspect, a communication system is provided. The communication system includes the foregoing network device and terminal device.

DESCRIPTION OF EMBODIMENTS

Figure 1:
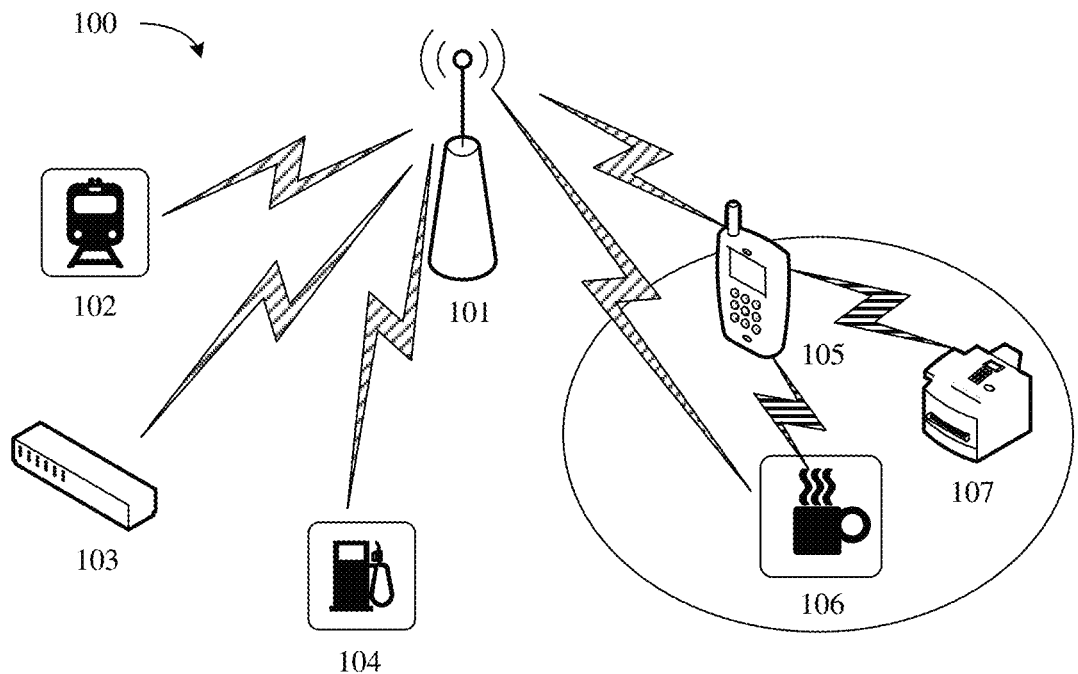
FIG. 1 is a schematic architectural diagram of a communication system used in a method for indicating channel state information CSI measurement according to at least one embodiment.

The following describes technical solutions in at least one embodiment with reference to accompanying drawings.

The technical solutions in at least one embodiment is applied to various communication systems, for example, a long term evolution (Long Term Evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a future 5th generation (5th Generation, 5G) mobile communication system, or a new radio access technology (new radio Access Technology, NR) system. The 5G mobile communication system includes a non-standalone (non-standalone, NSA) communication system and/or a standalone (standalone, SA) communication system.

The technical solutions described herein are also applied to a machine type communication (machine type communication, MTC) network, a long term evolution-machine (Long Term Evolution-machine, LTE-M) network, a device-to-device (device-to-device, D2D) network, a machine-to-machine (machine-to-machine, M2M) network, an internet of things (internet of things, IoT) network, or another network. The IoT network includes, for example, an internet of vehicles. Communication modes in an internet of vehicles system are collectively referred to as vehicle-to-another device (vehicle-to-X, V2X, where X represents anything). For example, the V2X includes vehicle-to-vehicle (vehicle-to-vehicle, V2V) communication, vehicle-to-infrastructure (vehicle-to-infrastructure, V2I) communication, vehicle-to-pedestrian (vehicle-to-pedestrian, V2P) communication, or vehicle-to-network (vehicle-to-network, V2N) communication.

The technical solutions described according to at least one embodiment are also applied to a future communication system, for example, a 6th generation (6th Generation, 6G) mobile communication system. This is not limited in embodiments described herein.

In at least one embodiment, a network device is any device having a wireless transceiver function. The device includes but is not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission reception point (transmission reception point, TRP), or the like; is a gNB or a transmission point (TRP or TP) in a 5G system, for example, an NR system, or one antenna panel or a group of antenna panels (including a plurality of antenna panels) of a base station in a 5G system; or is a network node, for example, a baseband unit (BBU) or a distributed unit (distributed unit, DU), included in a gNB or a transmission point, a base station in a next generation 6G communication system, or the like.

In some deployments, a gNB includes a centralized unit (centralized unit, CU) and a DU. The gNB further includes an active antenna unit (active antenna unit, AAU). The CU implements some functions of the gNB, and the DU implements some other functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and an active antenna-related function. Information at the RRC layer eventually becomes information at the PHY layer, or is changed from information at the PHY layer. Therefore, in this architecture, higher-layer signaling such as RRC layer signaling is also considered as being sent by the DU or sent by the DU and the AAU. The network device is a device including one or more of a CU node, a DU node, or an AAU node. In addition, the CU is classified into a network device in a radio access network (radio access network, RAN), or the CU is classified into a network device in a core network (core network, CN). This is not limited in embodiments described herein.

The network device serves a cell, and a terminal device communicates with the cell by using a transmission resource (for example, a frequency domain resource, namely, a spectrum resource) allocated by the network device. The cell belongs to a macro base station (for example, a macro eNB or a macro gNB), or belongs to a base station corresponding to a small cell (small cell). The small cell herein includes a metro cell (metro cell), a micro cell (micro cell), a pico cell (pico cell), a femto cell (femto cell), or the like. These small cells have characteristics of small coverage and low transmit power, and are used to provide a high-rate data transmission service.

In at least one embodiment, the terminal device is also referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus.

The terminal device is a device that provides a voice/data connectivity for a user, for example, a handheld device or a vehicle-mounted device that has a wireless connection function. Currently, some examples of the terminal is: a mobile phone (mobile phone), a tablet computer (pad), a computer (for example, a notebook computer or a palmtop computer) with a wireless transceiver function, a mobile internet device (mobile internet device, MID), a virtual reality (virtual reality, VR) device, an augmented reality (augmented reality, AR) device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device or computing device with a wireless communication function, another processing device connected to a wireless modem, a vehicle-mounted device, a wearable device, a terminal device in a 5G network, a terminal device in a future evolved public land mobile network (public land mobile network, PLMN), and the like.

The wearable device is also referred to as a wearable intelligent device, and is a general term of wearable devices such as glasses, gloves, watches, clothes, and shoes that are developed by applying wearable technologies in intelligent designs of daily wear. The wearable device is a portable device that is directly worn on the body or integrated into clothes or an accessory of a user. The wearable device is not only a hardware device, but also implements a powerful function through software support, data exchange, and cloud interaction. Generalized wearable intelligent devices include full-featured and large-size devices that implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device is alternatively a terminal device in an Internet of Things (internet of things, IoT) system. IoT is an important part of future information technology development. A main technical feature of the IoT is to connect things to a network by using a communication technology, to implement an intelligent network for human-machine interconnection and thing-thing interconnection. The IoT technology implements massive connections, deep coverage, and power saving for terminals by using, for example, a narrowband (narrowband, NB) technology.

In addition, the terminal device alternatively includes sensors such as an intelligent printer, a train detector, and a gas station. Main functions of the terminal device include: collecting data (which is a function of some terminal devices), receiving control information and downlink data of a network device, sending an electromagnetic wave, and transmitting uplink data to the network device.

To help understand embodiments described herein, the following briefly describes terms used herein.

1. Precoding: In response to a channel state being known, a network device processes a to-be-sent signal by using a precoding matrix that matches the channel state, so that a precoded to-be-sent signal adapts to a channel, to reduce complexity of eliminating inter-channel impact by a receiving device. Therefore, after the to-be-sent signal is precoded, received signal quality (for example, a signal to interference plus noise ratio (signal to interference plus noise ratio, SINR)) is improved. A sending device and a plurality of receiving devices implement transmission on a same time-frequency resource by using a precoding technology. That is, multi-user multiple-input multiple-output (multi-user multiple-input multiple-output, MU-MIMO) is implemented.

Related descriptions of the precoding technology in this specification are merely examples for ease of understanding, and are not intended to limit the protection scope of embodiments described herein. In a specific implementation process, the sending device alternatively performs precoding in another manner. For example, in response to channel information (for example but not limited to a channel matrix) not being known, precoding is performed by using a preset precoding matrix or through weighting. For brevity, specific content thereof is not described in this specification.

2. Channel reciprocity: In some communication modes such as time division duplex (time division duplex, TDD), signals are transmitted on uplink and downlink channels through a same frequency domain resource but different time domain resources. Within a short time period (for example, a coherence time period of channel propagation), the signals on the uplink and downlink channels suffer same channel fading. This is reciprocity between the uplink and downlink channels. Based on the reciprocity between the uplink and downlink channels, a network device measures the uplink channel based on an uplink reference signal, for example, a sounding reference signal (sounding reference signal, SRS), and estimate the downlink channel based on the uplink channel, to determine a precoding matrix for downlink transmission.

However, in some other communication modes such as frequency division duplex (frequency division duplex, FDD), because a band interval between uplink and downlink channels is far greater than a coherence bandwidth, there is no complete reciprocity between the uplink and downlink channels, and a precoding matrix for downlink transmission that is determined by using the uplink channel does not adapt to the downlink channel. However, in the FDD mode, partial reciprocity such as angle reciprocity and delay reciprocity still exists between the uplink and downlink channels. Therefore, an angle and a delay is also referred to as reciprocity parameters.

When a signal is transmitted through a radio channel, the signal arrives at a receive antenna through a plurality of paths from a transmit antenna. A multipath delay results in frequency selective fading, namely, a change of a channel in frequency domain. A delay is a transmission time period of a radio signal on different transmission paths, is determined based on a distance and a speed, and is irrelevant to a frequency domain of the radio signal. In response to a signal is transmitted on different transmission paths, there are different transmission delays due to different distances. Because physical locations of the network device and a terminal device are fixed, multipath distribution of the uplink and downlink channels is the same in terms of the delay. Therefore, delays of the uplink and downlink channels in the FDD mode is considered to be the same, in other words, reciprocal.

In addition, the angle is an angle of arrival (angle of arrival, AOA) at which the signal arrives at the receive antenna through the radio channel, or is an angle of departure (angle of departure, AOD) at which the signal is transmitted through the transmit antenna. In embodiments described herein, the angle is an angle of arrival at which an uplink signal arrives at the network device, or is an angle of departure at which the network device transmits a downlink signal. Due to reciprocity of transmission paths of the uplink and downlink channels on different frequencies, an angle of arrival of the uplink reference signal and an angle of departure of a downlink reference signal is considered to be reciprocal.

Optionally, each angle is represented by an angle vector. Each delay is represented by a delay vector. Therefore, in at least one embodiment, one angle vector represents one angle, and one delay vector represents one delay.

3. Reference signal (reference signal, RS): The reference signal is also referred to as a pilot (pilot), a reference sequence, or the like. In at least one embodiment, the reference signal is a reference signal for channel measurement. For example, the reference signal is a channel state information reference signal (channel state information reference signal, CSI-RS) or a synchronization signal and physical broadcast channel block (Synchronization Signal and Physical Broadcast Channel block, which is represented by an SS/PBCH block, SSB for short) for downlink channel measurement. The reference signals enumerated above are provided as examples, and do not constitute any limitation of embodiments described herein. Embodiments described herein do not exclude a possibility of defining another reference signal in a future protocol to implement a same or similar function.

In at least one embodiment, reference signals include a precoded reference signal and a non-precoded reference signal, and the precoded reference signal is a reference signal obtained through precoding. The precoding specifically includes beamforming (beamforming) and/or phase rotation. The beamforming is implemented, for example, by precoding a downlink reference signal based on one or more angle vectors, and the phase rotation is implemented, for example, by precoding a downlink reference signal based on one or more delay vectors.

In at least one embodiment, the precoding a downlink reference signal based on one or more angle vectors is also referred to as loading the one or more angle vectors to the downlink reference signal to implement the beamforming. The precoding a downlink reference signal based on one or more delay vectors is also referred to as loading the one or more delay vectors to the downlink reference signal to implement the phase rotation.

4. Port (port): which includes a transmit port (or referred to as a transmit port) and/or a receive port.

The transmit port is understood as a virtual antenna identified by a receiving device, and is a logical meaning. One antenna port is configured for each virtual antenna, each virtual antenna is a weighted combination of a plurality of physical antennas, and each antenna port corresponds to one reference signal port. The antenna port is configured to carry at least one of a specific physical channel and a specific physical signal. For signals sent through a same antenna port, regardless of whether the signals are sent through a same physical antenna or different physical antennas, channels corresponding to paths through which the signals pass during spatial transmission is considered to be the same or correlated (for example, large-scale channel properties such as channel matrices H are the same). In other words, in response to demodulating the signals sent through the same antenna port, a receive end considers that the channels for the signals are the same or correlated. To be specific, a channel on a symbol is defined by using an antenna port, and that antenna ports for two symbols are the same means that a channel on a symbol is inferred by using a channel on the other symbol.

Optionally, the transmit port is a port obtained through beamforming and phase rotation. For example, a reference signal of each transmit port is a precoded reference signal obtained by precoding a reference signal based on one angle vector and one delay vector. The transmit port is also referred to as a port for the precoded reference signal.

The reference signal of each transmit port is transmitted in one or more frequency domain units.

The receive port is understood as a receive antenna of the receiving device. For example, in downlink transmission, the receive port is a receive antenna of a terminal device.

5. Channel state information (channel state information, CSI): which includes at least one of the following information: a channel quality indicator (channel quality indicator, CQI), a precoding matrix indicator (precoding matrix indicator, PMI), a CSI-RS resource indicator (CSI-RS resource indicator), a synchronization signal and physical broadcast channel block (SSB) resource indicator (SS/PBCH block resource indicator, SSBRI), a layer indicator (layer indicator, LI), a rank indicator (rank indicator, RI), and reference signal received power (reference signal received power, RSRP). The RSRP is layer-1 RSRP (L1-RSRP). In at least one embodiment, the channel state information further includes a synchronization measurement result or indication information of the synchronization measurement result.

6. Frequency domain unit: The frequency domain unit occupies a segment of bandwidth in frequency domain. The frequency domain unit includes different types, and corresponds to different grouping units. The frequency domain unit includes but is not limited to a resource block (resource block, RB), a subband (subband), a subcarrier, or a bandwidth part (bandwidth part, BWP).

7. Angle vector: which is understood as a precoding vector for performing beamforming on a reference signal. Through the beamforming, a reference signal transmitted by a sending device has specific spatial directivity. Therefore, a process of precoding the reference signal based on the angle vector is also considered as a space domain (or referred to as space domain for short) precoding process. The angle vector is also referred to as a space domain vector, a beam (beam) vector, or the like.

A quantity of ports for a precoded reference signal obtained by precoding a reference signal based on one or more angle vectors is the same as a quantity of angle vectors. In response to the quantity K of angle vectors being less than a quantity T of transmit antenna ports in one polarization direction, antenna port dimension reduction is implemented through the space domain precoding, to reduce pilot overheads. K≥1, T≥1, and both K and T are integers.

The angle vector is a vector whose length is T.

Optionally, the angle vector is a discrete Fourier transform (Discrete Fourier Transform, DFT) vector. The DFT vector is a vector in a DFT matrix.

Optionally, the angle vector is a conjugate transpose vector of a DFT vector. The DFT conjugate transpose vector is a column vector in a conjugate transpose matrix of a DFT matrix.

Optionally, the angle vector is an oversampled DFT vector. The oversampled DFT vector is a vector in an oversampled DFT matrix.

In a possible design, the angle vector is, for example, a 2-dimensional (2-dimensional, 2D)-DFT vector $v_{l,m}$ defined in a type II (type II) codebook in the NR protocol TS 38.214 release 15 (release 15, R15). In other words, the angle vector is a 2D-DFT vector or an oversampled 2D-DFT vector.

An example of the 2D-DFT vector is enumerated below:

$$v_{i_1,i_2} = \left[ u_{i_2} \quad e^{j\frac{2\pi i_1}{O_1 I_1}} u_{i_2} \quad \ldots \quad e^{j\frac{2\pi i_1(I_1-1)}{O_1 I_1}} u_{i_2} \right]^T$$

$$u_{i_2} = \begin{cases} \left[ 1 \quad e^{j\frac{2\pi i_2}{O_2 I_2}} \quad \ldots \quad e^{j\frac{2\pi i_2(I_2-1)}{O_2 I_2}} \right] & I_2 > 1 \\ 1 & I_2 = 1 \end{cases}.$$

$I_1$ is a quantity of antenna ports in a same polarization direction that are included in each column (or row) in an antenna array, and $I_2$ is a quantity of antenna ports in the same polarization direction that are included in each row (or column) in the antenna array. In this embodiment, $T=I_1 \times I_2$. $O_1$ and $O_2$ are oversampling factors. $i_1$ and $i_2$ satisfy $0 \leq i_1 \leq (O_1 \times I_1 - 1)$ and $0 \leq i_2 \leq (O_2 \times I_2 - 1)$.

Optionally, the angle vector is a steering vector of a uniform linear array (uniform linear array, ULA), for example, is $$a(\theta_k) = \begin{bmatrix} 1 \\ e^{j\frac{2\pi}{\lambda}\cos\theta_k d} \\ \vdots \\ e^{j\frac{2\pi}{\lambda}\cos\theta_k (T-1)d} \end{bmatrix}.$$

$\theta_k$ is an angle, where k=1, 2, ..., or K. K represents a quantity of angle vectors, λ represents a wavelength, and d represents a distance between antennas.

The steering vector indicates a phase difference between angles of arrival of a path in responses of different antennas. The steering vector $a(\theta_k)$ and the vector $v_{i_1,i_2}$ in the DFT matrix satisfy $$\cos\theta_k d = \frac{i_1}{O_1 I_1}.$$

Optionally, the angle vector is a steering vector of a uniform plane array (uniform plane array, UPA). The steering vector is, for example, a steering vector that includes information about a horizontal angle and a pitch angle, for example, is $$a(\theta_k, \varphi_k) = \begin{bmatrix} e^{j\frac{2\pi}{\lambda}u_k \rho_1} \\ e^{j\frac{2\pi}{\lambda}u_k \rho_2} \\ \vdots \\ e^{j\frac{2\pi}{\lambda}u_k \rho_T} \end{bmatrix}.$$

$\theta_k$ is the horizontal angle; $\varphi_k$ is the pitch angle; $\rho_t$ is three-dimensional coordinates of a $t^{th}$ transmit antenna port, where t=1, 2, ..., or T; and $u_k$ is a unit spherical basis vector corresponding to a $k^{th}$ angle: $u_k$=[sin $\varphi_k$ cos $\varphi_k$ sin $\varphi_k$ sin $\varphi_k$ cos $\varphi_k$].

For ease of description, the angle vector is denoted as $a(\theta_k)$ below.

In downlink transmission, because a reference signal to which the angle vector is loaded is transmitted to a terminal device through a downlink channel, a channel measured by the terminal device based on a received precoded reference signal is equivalent to a channel to which the angle vector is loaded. For example, a downlink channel V to which the angle vector $a(\theta_k)$ is loaded is represented by $Va(\theta_k)$.

A single-polarized antenna is configured for the sending device, a quantity of transmit antenna ports is T, and a quantity of frequency domain units is N, where N≥1, and N is an integer. In this case, for one receive port of a receiving device, a channel estimated based on a received reference signal is an N×T-dimensional matrix. In response to space domain precoding being performed on a reference signal based on one angle vector, the angle vector is loaded to the reference signal. Because the angle vector is a T×1-dimensional angle vector, for one receive port of the receiving device, a channel estimated based on a precoded reference signal is an N×1 channel. In addition, on each receive port and in each frequency domain unit, a channel estimated by the terminal device based on the received precoded reference signal is a 1×1-dimensional channel.

The angle vector is a form provided in at least one embodiment for representing the angle. The angle vector is named only for ease of distinguishing from the delay, and does not constitute any limitation on embodiments described herein. Embodiments described herein do not exclude a possibility of defining another name in a future protocol to represent a same or similar meaning.

8. Delay vector: which is also referred to as a frequency domain vector. The delay vector is a vector that indicates a change rule of a channel in frequency domain. As described above, the multipath delay results in the frequency selective fading. From a Fourier transform, a time delay of a signal in time domain is equivalent to a phase gradient in frequency domain.

For example, for a signal g(t), the signal is transformed into a frequency domain through Fourier transform: $F(g(t)) = \int_{-\infty}^{+\infty} g(t)e^{j\omega x}dt$; for a signal $g(t-t_0)$, the signal is transformed into the frequency domain through Fourier transform: $F(g(t-t_0))=\int_{-\infty}^{+\infty} g(t-t_0)e^{j\omega x}dt=e^{j\omega t_0}F(g(t))$. $\omega$ is a frequency variable, different frequencies correspond to different phase rotations, and t and $t-t_0$ represent delays.

The signals of two delays is represented by $x(t)=g(t)+g(t-t_0)$, and therefore, a function $X(\omega)=g(\omega)(1+e^{j\omega t_0})$ of the frequency variable is obtained. Assuming that $g(\omega)=1$, $X(\omega)=g(\omega)(1+e^{j\omega t_0})$ is obtained. Therefore, the signals of the two different delays cause the frequency-domain selective fading.

Because a phase change of a channel in each frequency domain unit is related to a delay, a phase change rule of the channel in each frequency domain unit is indicated by the delay vector. In other words, the delay vector indicates a delay characteristic of the channel.

Precoding a reference signal based on the delay vector essentially means performing phase rotation on each frequency domain unit in frequency domain based on an element in the delay vector, to pre-compensate, by using a precoded reference signal, a frequency selective characteristic caused by the multipath delay. Therefore, a process of precoding the reference signal based on the delay vector is considered as a frequency domain precoding process.

Precoding a reference signal based on different delay vectors is equivalent to performing phase rotation on each frequency domain unit of a channel based on the different delay vectors. In addition, phase rotation angles of a same frequency domain unit varies. To distinguish between different delays, a network device separately precodes the reference signal based on each of L delay vectors.

Optionally, a length of the delay vector is N, and N is a quantity of frequency domain units carrying a reference signal (for example, a non-precoded reference signal or a precoded reference signal), where $N \geq 1$, and N is an integer.

Optionally, an $l^{th}$ delay vector in the L delay vectors is represented by $b(\tau_l)$, where $$b(\tau_l) = \begin{bmatrix} e^{-j2\pi f_0 \tau_l} \\ e^{-j2\pi f_1 \tau_l} \\ \vdots \\ e^{-j2\pi f_{N-1} \tau_l} \end{bmatrix}.$$

$l=0, 1, \ldots,$ or $L-1$; L represents a quantity of delay vectors; $f_0, f_1, \ldots,$ and $f_{N-1}$ respectively represent carrier frequencies of the $0^{th}$ frequency domain unit and the first to an $(N-1)^{th}$ frequency domain units.

Optionally, the delay vector is obtained from a DFT matrix, for example, is $$u_k = \begin{bmatrix} 1 & e^{j\frac{2\pi k}{O_f N}} & \ldots & e^{j\frac{2\pi k(N-1)}{O_f N}} \end{bmatrix}^T.$$

Each vector in the DFT matrix is referred to as a DFT vector.

$O_f$ is an oversampling factor, and $O_f \geq 1$; k is an index of the DFT vector, and satisfies $0 \leq k \leq O_f \times N-1$ or $1-O_f \times N \leq k \leq 0$.

For example, in response to $k<0$, $b(\tau_l)$ and the vector $u_k$ in the DFT matrix satisfies:

$$b(\tau_l) = u_k \beta_l \text{ and } \Delta f \tau_l = \frac{k}{O_f N},$$

where $\beta_l = e^{-j2\pi f_1 \tau_l}$, $\Delta f = f^n - f_{n+1}$, and $1 \leq n \leq N-1$.

For ease of description, the delay vector is denoted as $b(\tau_l)$ below.

In at least one embodiment, for ease of understanding, a specific process of performing frequency domain precoding on a reference signal is described by using a resource block (resource block, RB) as an example of the frequency domain unit. In response to the RB being used as the example of the frequency domain unit, a frequency domain unit includes only one RB for carrying the reference signal (which is referred to as, for example, a reference signal RB for short). Actually, each frequency domain unit includes one or more RBs carrying the reference signal. In response to a frequency domain unit including a plurality of RBs carrying the reference signal, a network device loads the delay vector to the plurality of RBs carrying the reference signal in each frequency domain unit.

In downlink transmission, because a reference signal to which the delay vector is loaded is transmitted to a terminal device through a downlink channel, a channel measured by the terminal device based on a received precoded reference signal is equivalent to a channel to which the delay vector is loaded. In an implementation, in response to frequency domain precoding being performed on a reference signal based on a delay vector whose length is N, N elements in the delay vector is respectively loaded to the reference signal carried on N resource blocks (resource blocks, RBs). For example, a channel $V^{(n)}$ that is on an $n^{th}$ RB and to which an $n^{th}$ element in the delay vector is loaded is represented by $V^{(n)} e^{j2\pi f_n \tau_l}$.

The frequency domain precoding is performed on the reference signal based on the delay vector before or after resource mapping. This is not limited in embodiments described herein.

9. Space-frequency matrix: In at least one embodiment, the space-frequency matrix is an intermediate item for determining a precoding matrix.

In at least one embodiment, the space-frequency matrix is determined based on a receive port, or is determined based on a transport layer. Therefore, the space-frequency matrix is determined based on a weighted sum of one or more angle-delay pairs, and the space-frequency matrix is also an N×T-dimensional matrix.

In response to the space-frequency matrix being determined based on the receive port, the space-frequency matrix is referred to as a space-frequency matrix corresponding to the receive port. The space-frequency matrix corresponding to the receive port is used to construct a downlink channel matrix of each frequency domain unit, so that a precoding matrix corresponding to each frequency domain unit is determined. For example, a channel matrix corresponding to a frequency domain unit is a conjugate transpose of a matrix constructed by using column vectors corresponding to the same frequency domain unit that are in space-frequency matrices corresponding to receive ports. For example, an $n^{th}$ column vector in the space-frequency matrix corresponding to each receive port is extracted, and a T×R-dimensional matrix is obtained by arranging the column vectors from left to right in a sequence of the receive ports. R indicates a quantity of receive ports, and R is an integer greater than or equal to 1. After conjugate transposition is performed on the matrix, a channel matrix $V^{(n)}$ of an $n^{th}$ frequency domain unit is obtained. A relationship between a channel matrix and a space-frequency matrix is described in detail below, and detailed descriptions of the relationship between a channel matrix and a space-frequency matrix are omitted herein.

In response to the space-frequency matrix being determined based on the transport layer, the space-frequency matrix is referred to as a space-frequency matrix corresponding to the transport layer. The space-frequency matrix corresponding to the transport layer is directly used to determine a precoding matrix corresponding to each frequency domain unit. For example, a precoding matrix corresponding to a frequency domain unit is constructed by using column vectors corresponding to the same frequency domain unit that are in space-frequency matrices corresponding to transport layers. For example, an $n^{th}$ column vector in the space-frequency matrix corresponding to each transport layer is extracted, and a T×Z-dimensional matrix is obtained by arranging the column vectors from left to right in a sequence of the transport layers. Z indicates a quantity of transport layers, and Z is an integer greater than or equal to 1. The matrix is used as a precoding matrix $W^{(n)}$ of an $n^{th}$ frequency domain unit.

A precoding matrix determined according to a channel measurement method provided in at least one embodiment is a precoding matrix directly used for downlink data transmission. Alternatively, some beamforming methods, for example, including zero forcing (zero forcing, ZF), a minimum mean square error (minimum mean square error, MMSE), and a maximum signal-to-leakage-and-noise ratio (signal-to-leakage-and-noise ratio, SLNR), is used to obtain a precoding matrix finally used for downlink data transmission. This is not limited in embodiments described herein. All precoding matrices below is precoding matrices determined according to the channel measurement method provided in embodiments described herein.

A relationship among a space-frequency matrix, a downlink channel matrix, and a precoding matrix is briefly described.

The space-frequency matrix is an intermediate item that is provided based on channel continuity in frequency domain and that is used to construct a precoding matrix. The space-frequency matrix H satisfies $H=SCF^H$. S represents a matrix constructed by using one or more (for example, K, where K is a positive integer) angle vectors, for example, $S=[a(\theta_1) a(\theta_2) \ldots a(\theta_K)]$; F represents a matrix constructed by using one or more (for example, L, where L is a positive integer) delay vectors, for example, $F=[b(\tau_1) b(\tau_2) \ldots b(\tau_L)]$; C represents a coefficient matrix constructed by using a weighting coefficient corresponding to each of the K angle vectors and each of the L delay vectors. Each element in C represents a weighting coefficient corresponding to one angle vector pair.

In an FDD mode, because of reciprocity between delays and angles of uplink and downlink channels, a space-frequency matrix $H_{UL}$ obtained through uplink channel measurement is expressed as $H_{UL}=SC_{UL}F^H$, and a space-frequency matrix H obtained through downlink channel measurement is expressed as $H_{DL}=SC_{DL}F^H$. Therefore, in at least one embodiment, a coefficient matrix $C_{DL}$ corresponding to the downlink channel is determined through the downlink channel measurement and is fed back, to determine a precoding matrix that adapts to the downlink channel.

In a unified description, $F^H$ is a conjugate transpose matrix of F.

In addition, to facilitate understanding of embodiments described herein, the following several descriptions are provided.

First, for ease of understanding, the following briefly describes main parameters in embodiments described herein.

P: a quantity of frequency domain units at an interval, where P is an integer greater than or equal to 0. For example, P=3 indicates that there are three frequency domain units between two specified frequency domain units. The two specified frequency domain units is equivalent to frequency domain units in a downlink reference signal resource that are indicated by first indication information and that are used by a terminal to obtain CSI in at least one embodiment.

T: a quantity of transmit ports, where T is a positive integer.

M: a quantity of frequency domain unit groups, where a frequency domain unit included in the frequency domain unit group is the frequency domain unit used by the terminal to obtain the CSI.

R: a quantity of receive ports, where R is a positive integer.

N: a quantity of frequency domain units carrying a reference signal, where N is a positive integer.

K: a quantity of angle vectors, where K is a positive integer.

L: a quantity of delay vectors, where L is a positive integer.

Second, in at least one embodiment, for ease of description, an identifier of a frequency domain unit is identification information (for example, an ID number or an identification index) of the frequency domain unit, or is position information (for example, a position ID or a position index) of the frequency domain unit. Any identifier that identifies the frequency domain unit falls within the concept scope. The identifier of the frequency domain unit starts from a number 0, indicating the first frequency domain unit. In response to the identifier of the frequency domain unit being indicated, the position information or the identification information of the frequency domain unit is indicated, in other words, the frequency domain unit is indicated. Similarly, a group number of a frequency domain unit group also starts from 0, indicating the first frequency domain unit group.

The foregoing descriptions are all provided to help describe the technical solutions provided in at least one embodiment, but are not intended to limit the scope of embodiment described herein.

Third, the "group" in embodiments described herein includes an actual group concept, and further includes a virtual group into which objects having a common feature are grouped for ease of description. The "group" does not necessarily have the actual group concept. The "group" includes one or more objects.

Fourth, "first", "second", "third", "fourth", "fifth", "sixth", "seventh", and various numbers in at least one embodiment are merely used for differentiation for ease of description, and are not construed as a limitation on the scope of embodiments described herein. For example, objects indicated by "first", "second", "third", "fourth", "fifth", "sixth", and "seventh" is a same object, partially same objects, or different objects. For example, second information and third information indicates same information, or indicates different information.

Fifth, in at least one embodiment, "indicate" includes "directly indicate" and "indirectly indicate". In response to indication information being described as indicating A, the indication information directly indicates A or indirectly indicate A, and does not mean that the indication information necessarily carries A.

Information indicated by the indication information is referred to as to-be-indicated information. In this case, in a specific implementation process, there are a plurality of manners of indicating the to-be-indicated information, for example but not limited to, a manner of directly indicating the to-be-indicated information, for example, indicating the to-be-indicated information or an index of the to-be-indicated information. The to-be-indicated information is alternatively indirectly indicated by indicating other information, where there is an association relationship between the other information and the to-be-indicated information. Alternatively, only a part of the to-be-indicated information is indicated, and the other part of the to-be-indicated information is known or pre-agreed on. For example, specific information is alternatively indicated by using an arrangement sequence of a plurality of pieces of information that is pre-agreed on (for example, stipulated in a protocol), to reduce indication overheads to some extent. For example, in response to a distribution density of frequency domain units according to a protocol, a frequency domain unit other than a start frequency domain unit at the distribution density is indicated by directly indicating the start frequency domain unit. In addition, a common part of all the pieces of information is further identified and indicated together, to reduce indication overheads caused by separately indicating same information.

Furthermore, specific indication manners is alternatively various existing indication manners, for example but not limited to, the foregoing indication manners and various combinations thereof. For details of the various indication manners, refer to a conventional technology. The details are not described in this specification. For example, in response to a plurality of pieces of information of a same type being indicated, different information is indicated in different manners. In a specific implementation process, an indication manner is selected based on a use. The selected indication manner is not limited in embodiments described herein. In this way, the indication manner in at least one embodiment does not cover various methods that enable a to-be-indicated party to learn of the to-be-indicated information.

In addition, the to-be-indicated information has another equivalent form. For example, an indication of a quantity of frequency domain unit groups is expressed as a quantity of downlink reference signal port groups, and vice versa. For another example, the distribution density is expressed as a position/identifier ascending manner or rule, or the like. The technical solutions provided in embodiments described herein is understood as covering various forms. For example, some or all features in embodiments described herein is understood as covering various representations of the features.

The indication information of the to-be-indicated information is sent as a whole, or is divided into a plurality of pieces of sub-information, where the pieces of sub-information are sent separately. In addition, sending periodicities and/or sending occasions of these pieces of sub-information is the same or is different. In addition, the indication information is separately or jointly indicated. For example, the indication information is separately indicated by different bits in a bitmap, or is jointly indicated by several bits in a bitmap. A specific sending method is not limited in at least one embodiment. The sending periodicities and/or the sending occasions of these pieces of sub-information is predefined, for example, predefined according to a protocol, or is configured by a transmit end device by sending configuration information to a receive end device. By way of example but not limitation, the configuration information includes one or a combination of at least two of radio resource control signaling, media access control (media access control, MAC) layer signaling, and physical layer signaling. The radio resource control signaling includes, for example, radio resource control (radio resource control, RRC) signaling. The MAC layer signaling includes, for example, a MAC control element (control element, CE). The physical layer signaling includes, for example, downlink control information (downlink control information, DCI).

Sixth, enumerated definitions of many features (for example, CSI, an RB, a subband, a subcarrier, a BWP, an angle, and a delay) in embodiments described herein are merely used to explain functions of the features by using examples. For detailed content thereof, refer to a conventional technology.

Seventh, "preset", "preset", "predetermining", "predefinition", or "preconfiguration" is implemented by pre-storing corresponding code or a corresponding table in a device (for example, including a terminal device and a network device) or in another manner that is used to indicate related information. A specific implementation thereof is not limited in embodiments described herein. "Storage" is storage in one or more memories. The one or more memories is separately configured, or is integrated into an encoder or a decoder, a processor, or a communication apparatus. Alternatively, a part of the one or more memories is separately configured, and the other part of the one or more memories are integrated into a decoder, a processor, or a communication apparatus. A type of the memory is a storage medium in any form, and this is not limited in embodiments described herein.

Eighth, a "protocol" in at least one embodiment is a standard protocol in the communication field, and for example, includes an LTE protocol, an NR protocol, and a related protocol used in a future communication system. This is not limited in embodiments described herein.

Ninth, "at least one" means one or more, and "a plurality of" means two or more. The term "and/or" describes an association relationship between associated objects and represents that three relationships exist. For example, A and/or B represent the following cases: Only A exists, both A and B exist, and only B exists, where A and B is singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one of a, b, and c represent: a, b, c, a and b, a and c, b and c, or a, b, and c, where a, b, and c each is singular or plural.

Tenth, in at least one embodiment, descriptions such as "when", "in a case", and "if" mean that a device (for example, a terminal device or a network device) performs corresponding processing in an objective situation, are not intended to limit time, the device (for example, the terminal device or the network device) does not perform a determining action during implementation, and does not mean any other limitation.

Eleventh, in at least one embodiment, an RB is a physical resource block (PRB), or is a common resource block (common resource block, CRB). This is not limited in embodiments described herein. The PRB is numbered by using a start position in a resource (for example, a bandwidth part (bandwidth part, BWP)) scheduled for a terminal device as a reference point, and the CRB is numbered by using a start position of bandwidth as a reference point. For specific definitions of the PRB and the CRB, refer to a conventional technology. For brevity, details are not described herein.

To facilitate understanding of embodiments described herein, a communication system used in a method according to embodiments described herein is first described in detail with reference to FIG. 1. FIG. 1 is a schematic diagram of a communication system 100 used in a method according to at least one embodiment. As shown in the figure, the communication system 100 includes at least one network device, for example, a network device 101 in a 5G system shown in FIG. 1. The communication system 100 further includes at least one terminal device, for example, terminal devices 102 to 107 shown in FIG. 1. The terminal devices 102 to 107 is moving or fixed. The network device 101 communicates with one or more of the terminal devices 102 to 107 through a radio link. A network device provides communication coverage for a particular geographic area, and communicates with a terminal device located in the coverage area. For example, the network device sends configuration information to the terminal device, and the terminal device sends uplink data to the network device based on the configuration information. For another example, the network device sends downlink data to the terminal device. Therefore, a communication system includes the network device 101 and the terminal devices 102 to 107 in FIG. 1.

Optionally, the terminal devices directly communicate with each other. For example, the direct communication between the terminal devices is implemented by using a D2D technology or the like. As shown in the figure, the terminal devices 105 and 106 directly communicate with each other by using the D2D technology, and the terminal devices 105 and 107 directly communicate with each other by using the D2D technology. The terminal devices 106 and 107 separately or simultaneously communicate with the terminal device 105.

The terminal devices 105 to 107 alternatively communicate with the network device 101 separately. For example, direct communication with the network device 101 is implemented. For example, the terminal devices 105 and 106 in the figure directly communicate with the network device 101. Alternatively, indirect communication with the network device 101 is implemented. For example, the terminal device 107 in the figure communicates with the network device 101 through the terminal device 106.

By way of example, FIG. 1 shows one network device, a plurality of terminal devices, and communication links between the communication devices. Optionally, the communication system 100 includes a plurality of network devices, and coverage of a network device includes another quantity of terminal devices, for example, more or fewer terminal devices. This is not limited in embodiments described herein.

A plurality of antennas is configured for each of the foregoing communication devices, for example, the network device 101 and the terminal devices 102 to 107 in FIG. 1. The plurality of antennas includes at least one transmit antenna configured to send a signal and at least one receive antenna configured to receive a signal. In addition, a communication device further additionally includes a transmitter chain and a receiver chain. A person of ordinary skill in the art understands that the transmitter chain and the receiver chain include a plurality of components (for example, a processor, a modulator, a multiplexer, a demodulator, a demultiplexer, or an antenna) related to signal sending and receiving. Therefore, the network device and the terminal device communicate with each other by using a multi-antenna technology.

Optionally, the wireless communication system 100 further includes another network entity, for example, a network controller or a mobility management entity. This is not limited in embodiments described herein.

For ease of understanding embodiments described herein, the following briefly describes a process of processing a downlink signal at a physical layer before the downlink signal is sent. The process of processing the downlink signal described below is performed by a network device, or is performed by a chip configured in the network device. For ease of description, the network device and the chip are collectively referred to as a network device below.

The network device processes a codeword (codeword) on a physical channel. The codeword is a coded bit obtained through coding (for example, including channel coding). The codeword is scrambled (scrambling) to generate a scrambled bit. Modulation mapping (modulation mapping) is performed on the scrambled bit, to obtain a modulated symbol. The modulated symbol is mapped to a plurality of layers (layers) through layer mapping (layer mapping). The layer is also referred to as a transport layer. The modulated symbol on which the layer mapping is performed is precoded (precoding), to obtain a precoded signal. The precoded signal is mapped to a plurality of resource elements (resource elements, REs) through RE mapping. These REs are then transmitted to the outside through an antenna port (antenna port) after orthogonal frequency division multiplexing (orthogonal frequency division multiplexing, OFDM) modulation is performed on the REs.

To obtain channel state information of a downlink channel, the network device 101 separately sends a downlink reference signal to the terminal devices to perform channel measurement and interference measurement. Each terminal device reports channel state information CSI, including, for example, any one of a precoding matrix indicator (precoding matrix indicator, PMI), a rank indicator (Rank Indicator, RI), and a channel quality indicator (channel quality indicator, CQI). The terminal device notifies the network device 101 of an optimal precoding matrix for current downlink transmission by using the PMI, and notify the network device 101 of an optimal quantity of layers for the current downlink transmission by using the RI. The CQI indicates an available modulation and coding scheme for ensuring, after the suggested RI and PMI are used, that a bit error rate of downlink data receiving does not exceed a predetermined value. The CSI is periodically or aperiodically reported to the network device 101. A difference between the two manners lies in different reporting configuration or triggering manners.

The reported CSI is further used by the network device to reconstruct a downlink channel. For example, in some communication modes such as frequency division duplex FDD, the network device 101 first receives a sounding reference signal (sounding reference signal, SRS) sent by a terminal device (for example, the terminal device 102), and estimates information (for example, angle information or delay information) with uplink and downlink reciprocity by using the uplink SRS. To obtain information with channel reciprocity based on an uplink channel, a base station side needs to project the uplink channel on a space domain base (S) or a frequency domain base (F), as shown below:

$$H_{UL}=SC_{UL}F^H$$

At least one corresponding column vector is selected from each of matrices S and F based on a size of an element in projected $C_{UL}$, where the column vectors are respectively denoted as s and f. Then, the network device 101 loads the obtained information (for example, s that is considered as the angle information and f that is considered as the delay information) with the uplink and downlink reciprocity to a downlink reference signal, and notifies the terminal device to perform measurement and feed back supplementary information that needs to be obtained by the network device 101. The terminal device estimates and feeds back, by using the downlink reference signal, CSI (for example, $C_{DL}$) that is used as the supplementary information (which is, for example, full-band or partial-subband amplitudes corresponding to each port). The network device uses the information (for example, s and f) with the uplink and downlink reciprocity and the CSI (for example, $C_{DL}$) to construct $C_{DL}$ based on s, f, and $C_{DL}$. A non-zero element in $c_{DL}$ is from $C_{DL}$, and a specific location of the non-zero element is determined based on s and f. In this way, a network side reconstructs the downlink channel according to $H_{DL} = Sc_{DL}F^H$. The foregoing FDD is merely an example, and an applicable scenario is not limited in embodiments described herein.

The process of processing the downlink signal described above is merely an example for description, and shall not constitute any limitation of embodiments described herein. For a specific process of processing a downlink signal, refer to a conventional technology. For brevity, detailed descriptions of the specific process are omitted herein.

With reference to the accompanying drawings, the following describes in detail a method for indicating channel state information (CSI) measurement provided in embodiments described herein.

For ease of understanding and description only, the following embodiments use interaction between a terminal device and a network device as an example to describe in detail the method provided in embodiments described herein. However, the interaction between a terminal device and a network device do not constitute any limitation on an execution body of the method provided in embodiments described herein. For example, the terminal device in the following embodiments is replaced with a component (for example, a chip or a chip system) configured in the terminal device. The network device in the following embodiments is replaced with a component (for example, a chip or a chip system) configured in the network device. This certainly does not mean that an improvement in a system lies in that steps on interaction sides need to be performed together. The technical solutions provided in embodiments described herein have an improvement on each side in the system.

A specific structure of the execution body of the method provided in embodiments described herein is not particularly limited in the following embodiments, provided that a program that records code of the method provided in embodiments described herein is run to perform communication according to the method provided in embodiments described herein. For example, the execution body of the method provided in embodiments described herein is the terminal device or the network device, or is a functional module that invokes and executes the program in the terminal device or the network device.

Figure 2:
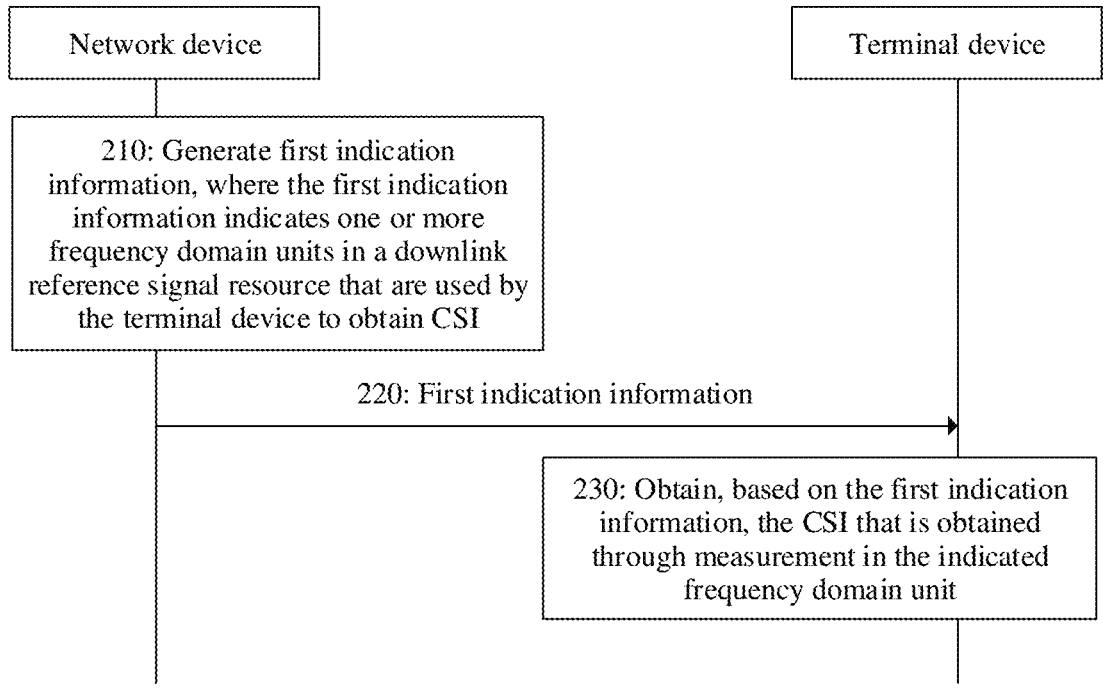
FIG. 2 is a schematic flowchart of a method for indicating channel state information CSI measurement according to at least one embodiment.

With reference to FIG. 2, the following describes in detail the method for indicating channel state information measurement provided in embodiments described herein. From a perspective of device interaction, FIG. 2 is a schematic flowchart of a method 200 for indicating channel state information (CSI) measurement according to at least one embodiment. The method 200 shown in FIG. 2 includes step 210 to step 230. The following describes the steps in the method 200 in detail.

Step 210: A network device generates first indication information, where the first indication information indicates one or more frequency domain units in a downlink reference signal resource that are used by a terminal device to obtain CSI.

The network device flexibly configures, in the downlink reference signal resource configured for the terminal device, the frequency domain unit used by the terminal device to perform CSI measurement. The frequency domain unit has different grouping units. For example, an RB, a subband, a subcarrier, or a BWP is used as the frequency domain unit.

Figure 3:
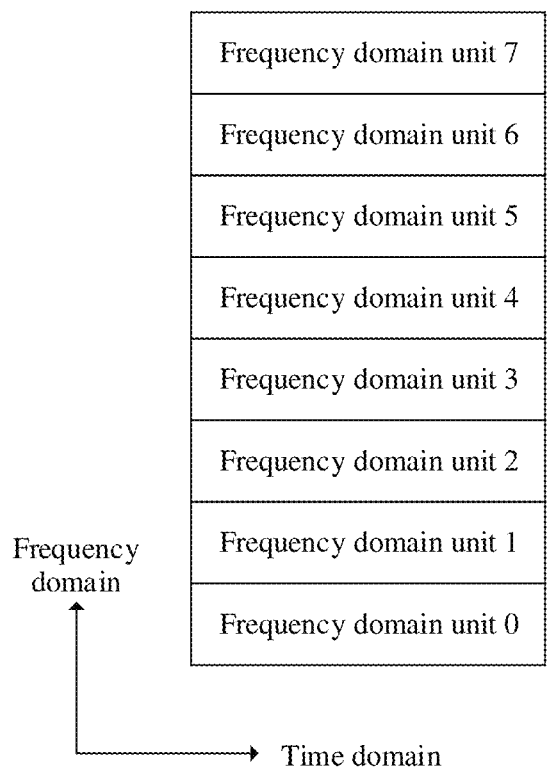
FIG. 3 is a schematic diagram of frequency domain units in a downlink reference signal resource according to at least one embodiment.

As shown in FIG. 3, the downlink reference signal resource configured by the network device for the terminal occupies eight frequency domain units in frequency domain, and identification information (for example, identification indexes) or position information (for example, position indexes) of the eight frequency domain units is 0 to 7. FIG. 3 is merely an example. In the example shown in FIG. 3, with reference to the downlink reference signal resource, a start frequency domain unit (the first frequency domain unit) of the downlink reference signal resource is used as a frequency domain unit 0. In this way, another frequency domain unit is sequentially numbered relative to the frequency domain unit 0. Optionally, in at least one embodiment, the frequency domain unit is alternatively determined based on an actual frequency domain position of the frequency domain unit in a system. For example, an actual start frequency domain unit (the first frequency domain unit) of the downlink reference signal resource is the fourth frequency domain unit in the system (where a position index of the start frequency domain unit is a frequency domain unit 3), and another frequency domain unit is also determined based on an actual frequency domain position of the another frequency domain unit in the system. In different scenarios, the position information and the identification information are replaced with each other or represent each other. In other words, the position information is indicated by the identification information, or the identification information is indicated by the position information.

In consideration with factors such as a system status (for example, a reference signal port, a system bandwidth, a scheduled bandwidth, a measurement bandwidth, resource utilization, or transmission power), the network device indicates, by using the first indication information according to a preset rule, the frequency domain unit used by the terminal device to obtain the CSI. To be specific, the first indication information indicates which frequency domain units in the downlink reference signal resource are used by the terminal device to perform CSI measurement and/or calculation. For example, the network device indicates, by using the first indication information, the terminal device to perform CSI measurement and/or calculation based on frequency domain units 2, 4, 6, 8, and 10.

The first indication information indicates the frequency domain unit in different manners such as direct indication, indirect indication, explicit indication, and implicit indication. The first indication information is not limited to necessarily carrying the identification information, the position information, or all related information of the frequency domain unit. Specific descriptions are provided below.

Step 220: The network device sends the first indication information to the terminal device. The terminal device receives the first indication information sent by the network device.

The network device sends the first indication information to the terminal device, to indicate the terminal device to obtain the CSI more pertinently. In at least one embodiment, a form of the indication information is not limited, and the indication information is indicated in different indication manners. The first indication information is carried in at least one of the following: a radio resource control (RRC) message, a media access control (MAC) control element (CE), and downlink control information (DCI). The enumerated signaling is merely examples, and do not constitute any limitation on embodiments described herein.

Step 230: The terminal device performs measurement in the indicated frequency domain unit based on the first indication information to obtain the CSI.

The terminal device determines, based on the indication by the first indication information, the frequency domain unit that is in the downlink reference signal resource and that is used to obtain the CSI. The terminal device obtains, for all downlink reference signal ports, the CSI based on the frequency domain unit for obtaining the CSI, to obtain information such as a PMI. Alternatively, the terminal device obtains, for different downlink reference signal port groups, the CSI based on a frequency domain unit that corresponds to each group and that is used to obtain the CSI. Grouping into the downlink reference signal port group is described in the following descriptions of the indication manner, and details are not described herein again.

The performing measurement in the frequency domain unit for obtaining the CSI to obtain the CSI is as follows: The terminal device adds up measurement results in the frequency domain units for the CSI measurement, to obtain the CSI. Specifically, the terminal device performs channel estimation based on an indication from a base station and a received CSI-RS, and then adds up channel estimation results corresponding to the frequency domain units, to obtain the measurement result. Alternatively, the terminal device performs FFT or IFFT on the frequency domain unit, and selects a direct current component to obtain the CSI. Specifically, the terminal device performs channel estimation based on the indication from the network device and a received CSI-RS, then performs IFFT/FFT on a channel estimation result corresponding to the frequency domain unit, and finally selects, as a measurement result, an $n^{th}$ point obtained through the IFFT/FFT, for example, a $0^{th}$ point (namely, the direct current component). Alternatively, other processing is performed. This is not limited in embodiments described herein, and any technical solution to performing measurement in the indicated frequency domain unit to obtain the CSI falls within the protection scope of embodiments described herein.

After obtaining the CSI, the terminal device reports the obtained CSI to the network device.

The following provides unified descriptions of the foregoing indication manner of the first indication information by using examples.

Manner 1:

The first indication information includes second indication information, indicating a start frequency domain unit in the frequency domain units for obtaining the CSI. The start frequency domain unit in the frequency domain units used by the terminal device to obtain the CSI is determined based on the indication by the second indication information. The start frequency domain unit is indicated by using position information or identification information of the start frequency domain unit. A position of the start frequency domain unit is a relative position of the start frequency domain unit in the downlink reference signal resource, or is an absolute position of the start frequency domain unit in the system. An identifier of the start frequency domain unit is a relative identifier of the start frequency domain unit in the downlink reference signal resource, or is an absolute identifier of the start frequency domain unit in the system. For ease of description, the downlink reference signal resource occupies only the eight frequency domain units in FIG. 3 in frequency domain, and the identification information (for example, the identification indexes) or the position information (for example, the position indexes) of the eight frequency domain units is 0 to 7. Using an example in which a position/an identifier of a frequency domain unit is a relative position/identifier of the frequency domain unit in the downlink reference signal resource, an indication manner shown in Table 1 is used as an example for description. Embodiments described herein are not limited to the manner in Table 1 that is used as an example. In the manner 1 and all the following manners, descriptions are provided by using an example in which an index is used as identification information or position information.

TABLE 1

| Second indication information | 111 | 110 | 101 | 011 | 100 | 010 | 001 | 000 |
|---|---|---|---|---|---|---|---|---|
| Start frequency domain unit | 7 | 6 | 5 | 4 | 3 | 2 | 1 | 0 |

The foregoing indication interpretation of the start frequency domain unit indicates indication interpretation of an index of the start frequency domain unit, for example, the indication interpretation in Table 1. For example, 0 represents a frequency domain unit whose index is 0, and 1 represents a frequency domain unit whose index is 1. The rest is deduced by analogy. Optionally, the foregoing indication interpretation of the start frequency domain unit is different from the indication interpretation in Table 1, but indicates a rank indication of the frequency domain unit in the downlink reference signal resource. For example, 1 represents the first frequency domain unit in the downlink reference signal resource, namely, a frequency domain unit whose index is 0. The indication interpretation is not limited in embodiments described herein.

Based on the indication by the second indication information, the terminal device determines at least the start frequency domain unit in the frequency domain units for obtaining the CSI. In response to being considered by default or pre-agreed that the frequency domain units for obtaining the CSI are the start frequency domain unit to the last frequency domain unit occupied by the downlink reference signal resource, and in response to a value of the second indication information being 010, based on the indication by the second indication information the frequency domain units for obtaining the CSI are frequency domain units whose indexes are 2, 3, 4, 5, 6, and 7.

Further optionally, distribution density, in the downlink reference signal resource, of the frequency domain units for obtaining the CSI is preset through agreement in advance, for example, through agreement in a protocol. For example, the distribution density is distribution at an interval of P frequency domain units, where P is an integer greater than or equal to 0. In response to the distribution density, in the downlink reference signal resource, of the frequency domain units that are used by the terminal device to obtain the CSI being predetermined, all the frequency domain units for obtaining the CSI is determined based on the indication by the second indication information. For example, the value of the second indication information is 010, and according to the protocol, the frequency domain unit for obtaining the CSI is either a frequency domain unit whose identification information or position information corresponds to an odd number or a frequency domain unit whose identification information or position information corresponds to an even number. This is equivalent to a case in which the distribution density is distribution at an interval of one frequency domain unit, in other words, P=1. The odd number and the even number herein are for a relative index or an absolute index, and are merely examples of a rule. In this case, based on the indication by the second indication information 010, the frequency domain units for obtaining the CSI are the frequency domain units whose indexes are 2, 4, and 6. For another example, in response to the value of the second indication information being 001, and according to the protocol, P=2, based on the indication by the second indication information 001, the frequency domain units for obtaining the CSI are the frequency domain units whose indexes are 1, 4, and 7.

The foregoing distribution density is defined in different manners. For example, the distribution density indicates the distribution at the interval of P frequency domain units, to be specific, there are P frequency domain units between two frequency domain units for obtaining the CSI. For another example, the distribution density is expressed as distribution every Q frequency domain units, where Q is an integer greater than or equal to 1, in other words, Q=P+1. For example, the start frequency domain unit for obtaining the CSI is the frequency domain unit 2. In response to Q=2, other frequency domain units for obtaining the CSI are the frequency domain units whose indexes are 4 and 6. The foregoing is merely examples, and the distribution density has another definition. Any technical solution that indicates a distribution status of the frequency domain units falls within the scope of this embodiment.

The foregoing examples are not intended to limit embodiments described herein.

Manner 2:

The first indication information includes: second indication information, indicating a start frequency domain unit in the frequency domain units for obtaining the CSI; and third indication information, indicating distribution density of the frequency domain units in the downlink reference signal resource. Different from the manner 1, the manner 2 uses the indication information to flexibly configure the distribution density. For ease of description, the downlink reference signal resource occupies only the eight frequency domain units in FIG. 3 in frequency domain, and the identification information (for example, the identification indexes) or the position information (for example, the position indexes) of the eight frequency domain units is 0 to 7. Using an example in which a position/an identifier of a frequency domain unit is a relative position/identifier of the frequency domain unit in the downlink reference signal resource, an indication manner shown in Table 2 is used as an example for description. Embodiments described herein are not limited to the manner in Table 2 that is used as an example. Table 2 uses a joint indication manner in which the second indication information and the third indication information are same information as an example. Optionally, the second indication information and the third indication information is alternatively different indication information, and separately give an indication.

TABLE 2

| Second indication information and third indication information | 111 | 110 | 101 | 011 | 100 | 010 | 001 | 000 |
|---|---|---|---|---|---|---|---|---|

TABLE 2-continued

| Distribution density | 1 | 0.5 | 0.5 | 0.25 | 0.25 | 0.25 | 0.25 | Reserved |
|---|---|---|---|---|---|---|---|---|
| Start frequency domain unit | 1 | 1 | 2 | 1 | 2 | 3 | 4 | Reserved |

The foregoing distribution density is defined in different manners. This is the same as the case in the manner 1. For example, the distribution density may indicate distribution at an interval of P frequency domain units, or the distribution density is expressed as distribution every Q frequency domain units. There is another definition, and any technical solution that indicates a distribution status of the frequency domain units falls within the scope of embodiments described herein. For example, in Table 2, the distribution density 1 indicates distribution every one frequency domain unit. To be specific, every frequency domain unit is a frequency domain unit for obtaining the CSI. This is also a distribution at an interval of 0 frequency domain units. For example, in response to the start frequency domain unit for obtaining the CSI being the frequency domain unit 2 whose index is 2, other frequency domain units for obtaining the CSI are the frequency domain units whose indexes are 3, 4, 5, 6, and 7. The distribution density 0.5 indicates distribution every two frequency domain units. To be specific, there is one frequency domain unit for obtaining the CSI in every two frequency domain units, and the density is ½=0.5. Distribution is also at an interval of one frequency domain unit. For example, in response to the start frequency domain unit for obtaining the CSI being the frequency domain unit 1 whose index is 1, other frequency domain units for obtaining the CSI are the frequency domain units whose indexes are 3, 5, and 7. The distribution density 0.25 indicates distribution every four frequency domain units. To be specific, there is one frequency domain unit for obtaining the CSI in every four frequency domain units, and the density is ¼=0.25. distribution is at an interval of three frequency domain units. For example, in response to the start frequency domain unit for obtaining the CSI being the frequency domain unit 0 whose index is 0, another frequency domain unit for obtaining the CSI is the frequency domain unit whose index is 4.

The foregoing indication interpretation of the start frequency domain unit indicates indication interpretation of the index of the start frequency domain unit, for example, the indication interpretation in Table 1. Optionally, the foregoing indication interpretation of the start frequency domain unit is different from the indication interpretation in Table 1, but is, for example, the indication interpretation in Table 2. For example, 1 represents the first frequency domain unit in the downlink reference signal resource, namely, a frequency domain unit whose index is 0. The indication interpretation is not limited in embodiments described herein. Reserved indicates a reserved indication value, and is reserved for another indication. This is merely an example. During indication, all status values in a corresponding field is used for indication; or a part of status values is used for indication, and the other part of the status values are reserved for another indication. In all indication manners in this embodiment, a case of Reserved is considered or not considered.

Table 2 is used as an example for description. In response to a value of the indication information being 110, the start frequency domain unit for obtaining the CSI is the first frequency domain unit in the downlink reference signal resource, namely, the frequency domain unit 0 whose index is 0; and the distribution density is distribution every two frequency domain units, to be specific, there is one frequency domain unit for obtaining the CSI in every two frequency domain units, in other words, the frequency domain units are distributed at an interval of one frequency domain unit. In this case, all frequency domain units in the downlink reference signal resource that are finally determined and that are used to obtain the CSI are the frequency domain units whose indexes are 0, 2, 4, and 6.

The distribution density of the frequency domain units for obtaining the CSI is flexibly configured in the indication manner 2 in comparison with the indication manner 1.

Manner 3:

The first indication information includes fourth indication information, indicating a quantity of frequency domain unit groups into which the frequency domain units for obtaining the CSI are grouped. The frequency domain unit groups correspond to different downlink reference signal ports. The manner 3 is equivalent to grouping the frequency domain units for obtaining the CSI. In at least one embodiment, these frequency domain unit groups correspond to different downlink reference signal ports. Therefore, grouping the frequency domain units is equivalent to grouping the downlink reference signal ports. In at least one embodiment, these frequency domain unit groups correspond to all downlink reference signal ports, in other words, the downlink reference signal ports are not grouped. For example, the downlink reference signal ports are 32 ports (ports) (downlink reference signal port identifiers of the 32 ports are 0 to 31). In response to the fourth indication information in Table 3 being 01, the frequency domain units 0 to 7 in the downlink reference signal resource are grouped into four groups, namely, a group 0: [0 4], a group 1: [1 5], a group 2: [2 6], and a group 3: [3 7], where a number in "[ ]" is an index of the frequency domain unit. All the four frequency domain unit groups correspond to the downlink reference signal ports 0 to 31. In this way, for the ports 0 to 31, CSI is separately obtained through measurement in the frequency domain units in the four frequency domain unit groups. A feature of this solution is that for the ports 0 to 31, the terminal device performs addition in the frequency domain units in the group 0, to obtain 32 measurement coefficients, performs addition in the frequency domain units in the group 1, to obtain other 32 measurement coefficients, and then obtains 32 measurement coefficients in each of the group 2 and the group 3. In this way, 128 measurement coefficients are obtained by using the 32 ports. Similar to the manner 1 and the manner 2, this case does not limit grouping of the downlink reference signal ports. In the manner 1 and the manner 2, for example, the frequency domain unit that is used to obtain the CSI and that is indicated by the first indication information is used for all the downlink reference signal ports. For example, the downlink reference signal ports are the 32 ports (ports). Assuming that in the manner 1 or the manner 2, the frequency domain units for obtaining the CSI are indicated as the frequency domain units whose indexes are 0, 2, 4, and 6, the terminal device obtains the CSI for the 32 downlink reference signal ports in the frequency domain units whose indexes are 0, 2, 4, and 6. Certainly, in the manner 1 and the manner 2, the frequency domain units for obtaining the CSI is also grouped into frequency domain unit groups, and the frequency domain unit groups correspond to different downlink reference signal ports. For example, a quantity of frequency domain unit groups into which the frequency domain units for obtaining the CSI are grouped or a quantity of downlink reference signal port groups is agreed on in a protocol or indicated by signaling, and an association relationship between a frequency domain unit group and a downlink reference signal port group is determined according to a corresponding rule (which is agreed on in a protocol or indicated by signaling). Optionally, the manner 1/manner 2 is alternatively combined with the manner 3/manner 4. Similarly, the downlink reference signal resource occupies only the eight frequency domain units in FIG. 3 in frequency domain, and the identification information (for example, the identification indexes) or the position information (for example, the position indexes) of the eight frequency domain units is 0 to 7. Using an example in which a position/an identifier of a frequency domain unit is a relative position/identifier of the frequency domain unit in the downlink reference signal resource, an indication manner shown in Table 3 is used as an example for description. Because the case in which the frequency domain unit group corresponds to all the downlink reference signal ports is described above by using the example, the following mainly describes a case in which the frequency domain unit groups correspond to different downlink reference signal ports, in other words, a case in which the downlink reference signal ports are also grouped. Embodiments described herein are not limited to the manner in Table 3 that is used as an example.

TABLE 3

| | Fourth indication information | | | |
|---|---|---|---|---|
| | 11 | 10 | 01 | 00 |
| Quantity of groups | 1 | 2 | 4 | Reserved |

The quantity of frequency domain unit groups in the downlink reference signal resource that are used by the terminal device to obtain the CSI is determined by using the fourth indication information. Because the frequency domain unit groups correspond to different downlink reference signal ports, a quantity of groups into which the downlink reference signal ports are grouped is determined. For example, in response to 10 being indicated, the eight frequency domain units whose indexes are 0 to 7 are grouped into two groups for respectively obtaining CSI for different downlink reference signal ports.

Optionally, a correspondence between the frequency domain unit groups and the different downlink reference signal ports is preset or is indicated by fifth indication information included in the first indication information. The correspondence between the frequency domain unit groups and the different downlink reference signal ports is preset, for example, predefined in a protocol, or is flexibly configured. For example, the downlink reference signal ports are evenly grouped, and a sequence of groups corresponds to a sequence of the frequency domain unit groups (to be specific, group numbers of the downlink reference signal ports in ascending order respectively correspond to group numbers of the frequency domain units in ascending order). The example in which the downlink reference signal ports are the 32 ports is still used. In response to 10 being indicated, the eight frequency domain units whose indexes are 0 to 7 are grouped into two groups; the 32 ports are grouped into two groups; for the first 16 ports, CSI is obtained based on the frequency domain units whose indexes are 0 to 3; and for the last 16 ports, CSI is obtained based on the frequency domain units whose indexes are 4 to 7. Certainly, according to a protocol group numbers of the downlink reference signal ports in ascending order respectively correspond to group numbers of the frequency domain units in descending order. For example, the 32 ports are grouped into two groups, where a group number 0 represents the first group including the port numbers 0 to 15, and a group number 1 represents the second group including the port numbers 16 to 31; a group number 0 in the frequency domain unit groups represents the first group including the frequency domain units 0 to 3, and a group number 1 represents the second group including the frequency domain units 4 to 7. For the ports 0 to 15, CSI is obtained based on the frequency domain units 4 to 7; and for the ports 16 to 31, CSI is obtained based on the frequency domain units 0 to 3. The foregoing examples of the correspondence do not limit embodiments described herein. There is another correspondence in at least one embodiment.

With reference to the indication by the fifth indication information, Table 4 is used as an example for description. Table 4 uses a joint indication manner in which the fourth indication information and the fifth indication information are same information as an example. Optionally, the fourth indication information and the fifth indication information is different indication information, and separately give an indication.

TABLE 4

| Fourth indication information and fifth indication information | 111 | 110 | 101 | 011 | 100 | 010 | 001 | 000 |
|---|---|---|---|---|---|---|---|---|
| Quantity of groups | 1 | 1 | 2 | 2 | 4 | 4 | Reserved | Reserved |
| Correspondence | Correspondence 1 | Correspondence 2 | Correspondence 1 | Correspondence 2 | Correspondence 1 | Correspondence 2 | Reserved | Reserved |

In response to the correspondence in Table 4 being the correspondence 1, the group numbers of the downlink reference signal ports in ascending order respectively correspond to the group numbers of the frequency domain units in ascending order. In response to the correspondence in Table 4 is the correspondence 2, the group numbers of the downlink reference signal ports in ascending order respectively correspond to the group numbers of the frequency domain units in descending order. The two correspondences are merely examples. For example, there is a correspondence between parity of a group number of a port and parity of a group number of a frequency domain unit, or a correspondence between a port group number x and a frequency domain unit group number i is specifically indicated. The correspondence is flexibly configured by using the fifth indication information.

Manner 4:

The first indication information includes: fourth indication information, indicating a quantity of frequency domain unit groups into which the frequency domain units for obtaining the CSI are grouped; and sixth indication information, indicating a start frequency domain unit of the first group in the frequency domain unit groups for obtaining the CSI. The frequency domain unit groups correspond to different downlink reference signal ports. In response to grouping into the frequency domain unit group used by a user to obtain the CSI not always starting from the first frequency domain unit in all frequency domain units in the downlink reference signal resource, a frequency domain position of the frequency domain unit group for obtaining the CSI is flexibly configured based on the indication by the sixth indication information. The following uses Table 5 as an example for description. Table 5 uses a joint indication manner in which the fourth indication information and the sixth indication information are same information as an example. Optionally, the fourth indication information and the fifth indication information is different indication information, and separately give an indication.

TABLE 5

| Fourth indication information and sixth indication information | 111 | 110 | 101 | 011 | 100 | 010 | 001 | 000 |
|---|---|---|---|---|---|---|---|---|
| Quantity of groups | 1 | 2 | 2 | 4 | 4 | 4 | 4 | Reserved |
| Start point of a group 0 | 1 | 1 | 2 | 1 | 2 | 3 | 4 | Reserved |

Figure 5:
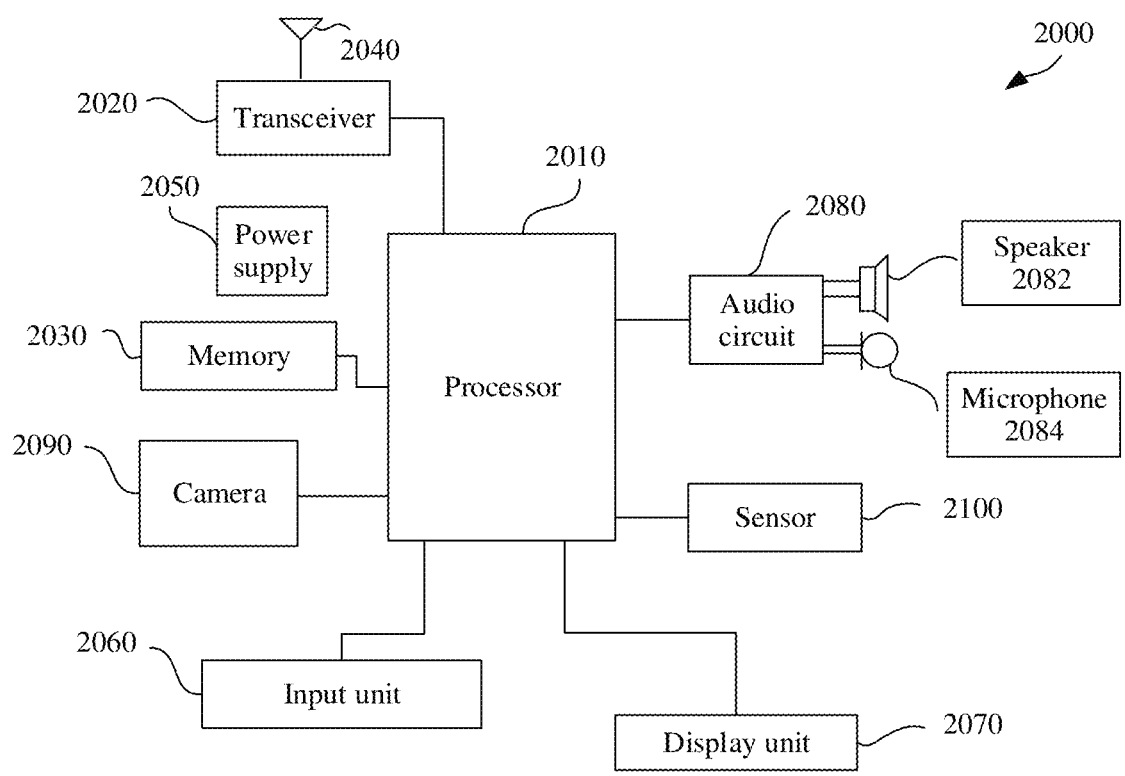
FIG. 5 is a schematic diagram of a structure of a terminal device according to at least one embodiment.

The start point of the group 0 represents a start frequency domain unit of a frequency domain unit group whose group number is 0 (namely, the first frequency domain unit group) in the frequency domain unit groups. Indication interpretation of the start point indicates indication interpretation of an index of the start point, for example, the indication interpretation in Table 1 or the indication interpretation in Table 2. FIG. 5 uses indication interpretation the same as that in Table 2 as an example. For example, 1 represents the first frequency domain unit in the downlink reference signal resource, namely, a frequency domain unit whose index is 0. The indication interpretation is not limited in embodiment described herein.

The quantity of frequency domain unit groups in the downlink reference signal resource that are used by the terminal device to obtain the CSI and the start frequency domain unit of the first frequency domain unit group whose group number is 0 is determined based on the indication information in Table 5. Because the frequency domain unit groups correspond to the different downlink reference signal ports, a quantity of groups into which the downlink reference signal ports are grouped is determined. For example, in response to 101 being indicated, the eight frequency domain units whose indexes are 0 to 7 are grouped into two groups for respectively obtaining CSI for different downlink reference signal ports, and the frequency domain unit group whose group number is 0 starts from the second frequency domain unit in the downlink reference signal resource, to be specific, indexes of frequency domain units included in the frequency domain unit group whose group number is 0 are 1, 2, 3, and 4, and indexes of frequency domain units included in a frequency domain unit group whose group number is 1 are 5, 6, 7, and 0.

Optionally, a correspondence between the frequency domain unit groups and the different downlink reference signal ports is preset or is indicated by fifth indication information included in the first indication information. For details, refer to the descriptions in the manner 3. Herein, a simple example is used for description. The 32 ports are still used as an example. According to a protocol, the downlink reference signal ports are evenly grouped, and a sequence of groups corresponds to a sequence of the frequency domain unit groups. In this case, in response to 101 being indicated, indexes of frequency domain units included in the frequency domain unit group whose group number is 0 are 1, 2, 3, and 4, and the frequency domain units are used to obtain CSI for the downlink reference signal ports whose numbers are 0 to 15; and indexes of frequency domain units included in the frequency domain unit group whose group number is 1 are 5, 6, 7, and 0, and the frequency domain units are used to obtain CSI for the downlink reference signal ports whose numbers are 16 to 31.

In the manner 4, the first indication information further includes the foregoing fifth indication information. Table 6 is used as an example for description.

TABLE 6

| Fourth indication information, fifth indication information, and sixth indication information | 111 | 110 | 101 | 011 | 100 | 010 | 001 | 000 |
|---|---|---|---|---|---|---|---|---|
| Quantity of groups | 1 | 2 | 2 | 4 | 4 | 4 | 4 | Reserved |
| Start point of a group 0 | 1 | 1 | 2 | 1 | 2 | 3 | 4 | Reserved |
| Correspondence | Correspondence 1 | Correspondence 2 | Correspondence 2 | Correspondence 1 | Correspondence 2 | Correspondence 2 | Correspondence 1 | Reserved |

For interpretation of the correspondence in Table 6, refer to the descriptions in Table 4. Details are not described herein again. The correspondence is flexibly configured by using the fifth indication information. The 32 ports are still used as an example. In response to 101 being indicated, indexes of frequency domain units included in the frequency domain unit group whose group number is 0 are 1, 2, 3, and 4, and the frequency domain units are used to obtain CSI for the downlink reference signal ports whose numbers are 16 to 31; and indexes of frequency domain units included in the frequency domain unit group whose group number is 1 are 5, 6, 7, and 0, and the frequency domain units are used to obtain CSI for the downlink reference signal ports whose numbers are 0 to 15.

Optionally, distribution density, in the downlink reference signal resource, of the frequency domain units of each frequency domain unit group is preset through agreement in advance, for example, through agreement in a protocol. This is similar to the case in the manner 1. For example, the distribution density is distribution at an interval of P frequency domain units, where P is an integer greater than or equal to 0. In response to the distribution density being predetermined, a scenario in which the frequency domain units in the downlink reference signal resource is flexibly grouped is extended. Table 5 is used as an example. For example, according to the protocol, the distribution density is distribution at an interval of one frequency domain unit. In response to 101 being indicated, the eight frequency domain units whose indexes are 0 to 7 are grouped into two groups for respectively obtaining CSI for different downlink reference signal ports, and the frequency domain unit group whose group number is 0 starts from the second frequency domain unit in the downlink reference signal resource. In this case, based on the preset distribution density indexes of frequency domain units included in the frequency domain unit group whose group number is 0 are 1, 3, 5, and 7, and indexes of frequency domain units included in the frequency domain unit group whose group number is 1 are 2, 4, 6, and 0 are determined. For descriptions of the distribution density, refer to the manner 1. Details are not described herein again.

Optionally, the distribution density is indicated by indication information, denoted as eighth indication information. Similar to the third indication information in the manner 2, the eighth indication information is further included in the first indication information based on the example in Table 5 or Table 6, where the eighth indication information is used to indicate the distribution density, in the downlink reference signal resource, of the frequency domain units of each frequency domain unit group. Refer to the descriptions in the foregoing manner 2, and details are not described herein again.

Optionally, the first indication information further includes seventh indication information, indicating a start frequency domain unit of a group other than the first group in the frequency domain unit groups. The frequency domain units in the downlink reference signal resource that are used to obtain the CSI is unevenly grouped based on the indication by the seventh indication information. For example, the eight frequency domain units are indicated to be grouped into two groups, an index of a start frequency domain unit in a group 0 is 2, and an index of a start frequency domain unit in a group 1 is 5. In this case, indexes of frequency domain units included in the group 0 are 2, 3, and 4, and indexes of frequency domain units included in the group 1 are 5, 6, 7, and 0 are determined.

Optionally, According to a protocol, a start frequency domain unit of a group other than the first group in the frequency domain unit groups satisfies a predetermined condition. In the following descriptions as an example, the predetermined condition is:

$(G_i+R_0) \bmod M$ where $G_i$ is a group number of the frequency domain unit group, where i=0, 1, 2, . . . , or M; $R_0$ is a frequency domain unit identifier of the start frequency domain unit of the first group in the frequency domain unit groups; M is the quantity of frequency domain unit groups; and mod indicates obtaining a remainder of $(G_i+R_0)$ divided by M.

For another example, the predetermined condition is:

$(M_i+R_0-G_i) \bmod M$ where $G_i$ is a group number of the frequency domain unit group, where i=0, 1, 2, . . . , or M; $R_0$ is a frequency domain unit identifier of the start frequency domain unit of the first group in the frequency domain unit groups; M is the quantity of frequency domain unit groups; and mod indicates obtaining a remainder of ($G_i$+$R_0$) divided by M. A predetermined condition as an example in another manner below is alternatively replaced with the condition herein or another condition. The predetermined condition is not limited in embodiments described herein.

In response to the start frequency domain unit of the first group being determined based on the indication information, a frequency domain unit identifier of the start frequency domain unit of the remaining group is determined by using the foregoing predetermined condition, so that the start frequency domain unit of the remaining group is determined. The frequency domain unit identifier herein is position information (for example, a position index) or identification information (for example, an identification index) of the frequency domain unit.

In comparison with a manner 5 of directly indicating each frequency domain unit by using a different value of a corresponding field, indication overheads is reduced to some extent in the foregoing manner 1 to manner 4. The manner 5 is described below.

Manner 5:

The first indication information indicates the frequency domain unit by indicating an identifier or a position of the frequency domain unit. The frequency domain unit that is in the downlink reference signal resource and that is used by the terminal device to obtain the CSI is directly indicated without regard to indication overheads. Still using the example in which the downlink reference signal resource occupies the eight frequency domain units whose indexes are 0 to 7, descriptions are provided by using Table 7 as an example.

TABLE 7

| Frequency domain unit index | 0 | 1 | 2 | 3 | 4 | 5 | 6 | 7 |
|---|---|---|---|---|---|---|---|---|
| First indication information | 1 | 0 | 1 | 1 | 0 | 1 | 1 | 0 |

In the manner 5, different frequency domain units are separately indicated in a form of a bitmap (bitmap). For example, for a frequency domain unit whose frequency domain unit index is 1, a value 0 of the first indication information indicates that the frequency domain unit is not a frequency domain unit for obtaining the CSI. For a frequency domain unit whose frequency domain unit index is 3, a value 1 of the first indication information indicates that the frequency domain unit is a frequency domain unit for obtaining the CSI. Therefore, based on the indication as an example in Table 7, indexes of the frequency domain units for obtaining the CSI are 0, 2, 3, 5, and 6 are determined.

Although indication overheads are increased, indication flexibility is higher in the manner 5.

Manner 6:

The first indication information implicitly indicates, by indicating the measurement bandwidth, the frequency domain unit for obtaining the CSI. Optionally, the first indication information is configuration information of the measurement bandwidth, or the first indication information indirectly indicates the measurement bandwidth. In at least one embodiment, a correspondence between the measurement bandwidth and a quantity of frequency domain unit groups is that shown in Table 8 as an example. In addition, a specific position and distribution density of each frequency domain unit group are agreed on. For example, a start frequency domain unit of the first frequency domain unit group and a start frequency domain unit of a remaining group satisfy a predetermined condition. For example, the start frequency domain unit of the first frequency domain unit group is the first frequency domain unit (namely, the frequency domain unit 0 whose index is 0) in the downlink reference signal resource, and a start frequency domain unit of a group other than the first group satisfies the predetermined condition. For example, the predetermined condition is: ($G_i$+$R_0$) mod M. For a definition of the predetermined condition, refer to the descriptions in the manner 4. The distribution density of each frequency domain unit group is similar to the example in the foregoing manner, and is expressed as distribution every Q frequency domain units. Optionally, Q=M is denoted as density equal to 1/M. At least one of the start frequency domain unit of the first frequency domain unit group, the start frequency domain unit of the group other than the first group, and the distribution density of each frequency domain unit group is alternatively indicated by indication information. A relationship between the indication information and the first indication information is not limited in embodiments described herein.

That the downlink reference signal resource occupies the eight frequency domain units whose indexes are 0 to 7 is still used as an example. Based on a correspondence in Table 8, in response to the measurement bandwidth indicated by the network device by using the first indication information being 10 MHz, according to pre-agreement in a protocol a start position of the first frequency domain unit group is the first frequency domain unit (the frequency domain unit 0) in the downlink reference signal resource and a start frequency domain unit of a remaining group satisfies ($G_i$+$R_0$) mod M, and distribution density of each frequency domain unit group is 1/M, the terminal device determines that there are four frequency domain unit groups for obtaining the CSI, the first group occupies the frequency domain units 0 and 4, the second group occupies the frequency domain units 1 and 5, the third group occupies the frequency domain units 2 and 6, and the fourth group occupies the frequency domain units 3 and 7.

TABLE 8

| | Measurement bandwidth | | | |
|---|---|---|---|---|
| | <5 MHz | ≥5 MHz & <10 MHz | ≥10 MHz & <20 MHz | ≥20 MHz |
| Quantity (M) of frequency domain unit groups | 1 | 2 | 4 | 8 |

In at least one embodiment, a correspondence between the measurement bandwidth and distribution density P (refer to the descriptions of P in the foregoing other manners) of the frequency domain units for obtaining the CSI is agreed on in a protocol. For example, the correspondence is that shown in Table 9. In addition, a position of the start frequency domain unit in the frequency domain units for obtaining the CSI is agreed on in a protocol. For example, in response to the measurement bandwidth configured by the network device being 10 MHz, and according to the protocol, the position of the start frequency domain unit is the first frequency domain unit (namely, the frequency domain unit 0), the frequency domain units used by the terminal device to obtain the CSI are the frequency domain units 0 and 4.

TABLE 9

| | Measurement bandwidth | | | |
|---|---|---|---|---|
| | <5 MHz | ≥5 MHz & <10 MHz | ≥10 MHz & <20 MHz | ≥20 MHz |
| Distribution density (P) | 0 | 1 | 3 | 7 |

In an implementation, the measurement bandwidth is indicated by a newly added field or signaling, or is configured by using CSI-FrequencyOccupation in CSI-RS-ResourceMapping of RRC signaling.

The correspondence between the measurement bandwidth and the quantity of frequency domain unit groups or the distribution density in the foregoing table is used in at least one embodiment. In addition, the quantity of frequency domain unit groups or the distribution density is alternatively indicated by indication information. A relationship between the indication information and the first indication information is not limited in embodiments described herein.

Manner 7:

The first indication information implicitly indicates, by indicating a quantity of CSI-RS ports, the frequency domain unit for obtaining the CSI. Optionally, the first indication information is configuration information of a CSI-RS port, or the first indication information indirectly indicates the quantity of CSI-RS ports. In an implementation, according to a protocol, a correspondence between the quantity of CSI-RS ports and a quantity of frequency domain unit groups is that shown in Table 10 as an example. In addition, a specific position and distribution density of each frequency domain unit group are agreed on. For example, a start frequency domain unit of the first frequency domain unit group and a start frequency domain unit of a remaining group satisfy a predetermined condition. For example, the start frequency domain unit of the first frequency domain unit group is the first frequency domain unit (namely, the frequency domain unit 0 whose index is 0) in the downlink reference signal resource, and a start frequency domain unit of a group other than the first group satisfies the predetermined condition. For example, the predetermined condition is: $(G_i + R_0) \bmod M$. For a definition of the predetermined condition, refer to the descriptions in the manner 4. The distribution density of each frequency domain unit group is similar to the example in the foregoing manner, and is expressed as distribution every Q frequency domain units. Optionally, Q=M is denoted as density equal to 1/M. At least one of the start frequency domain unit of the first frequency domain unit group, the start frequency domain unit of the group other than the first group, and the distribution density of each frequency domain unit group is alternatively indicated by indication information. A relationship between the indication information and the first indication information is not limited in embodiments described herein.

That the downlink reference signal resource occupies the eight frequency domain units whose indexes are 0 to 7 is still used as an example. Based on a correspondence in Table 10, in response to the quantity of CSI-RS ports that is indicated by the network device by using the first indication information being 16, according to a protocol, a start position of the first frequency domain unit group is the first frequency domain unit (the frequency domain unit 0) and the start frequency domain unit of the remaining group satisfies $(G_i + R_0) \bmod M$, and the distribution density of each frequency domain unit group is 1/M, the terminal device determines that there are four frequency domain unit groups for obtaining the CSI, the first group occupies the frequency domain units 0 and 4, the second group occupies the frequency domain units 1 and 5, the third group occupies the frequency domain units 2 and 6, and the fourth group occupies the frequency domain units 3 and 7.

TABLE 10

| Quantity of CSI-RS ports | [1, 2, 4] | [8, 12] | [16, 24] | 32 |
|---|---|---|---|---|
| Quantity (M) of frequency domain unit groups | 1 | 2 | 4 | 8 |

The correspondence between the quantity of CSI-RS ports and the quantity of frequency domain unit groups is a correspondence shown in Table 10 in which a larger quantity of ports indicates a larger quantity of frequency domain unit groups, or is a correspondence shown in Table 10' in which a larger quantity of ports indicates a smaller quantity of frequency domain unit groups. Certainly, embodiments described herein are not limited to rules of the two correspondences, and these are provided as examples.

TABLE 10'

| Quantity of CSI-RS ports | [1, 2, 4] | [8, 12] | [16, 24] | 32 |
|---|---|---|---|---|
| Quantity (M) of frequency domain unit groups | 8 | 4 | 2 | 1 |

In at least one embodiment, a correspondence between the quantity of CSI-RS ports and distribution density P (refer to the descriptions of P in the foregoing other manners) of the frequency domain units for obtaining the CSI is agreed on in a protocol. For example, the correspondence is that shown in Table 11. In addition, a start position of the frequency domain unit for obtaining the CSI is agreed on in a protocol. For example, in response to the quantity of CSI-RS ports that is configured by the network device being 16, and according to a protocol, a position of the start frequency domain unit is the first frequency domain unit (namely, the frequency domain unit 0), the frequency domain units used by the terminal device to obtain the CSI are the frequency domain units 0 and 4.

TABLE 11

| Quantity of CSI-RS ports | [1, 2, 4] | [8, 12] | [16, 24] | 32 |
|---|---|---|---|---|
| Distribution density (P) | 0 | 1 | 3 | 7 |

The correspondence between the quantity of CSI-RS ports and the distribution density (P) is a correspondence shown in Table 11 in which a larger quantity of ports indicates sparser distribution density (to be specific, a larger quantity P of frequency domain units at an interval), or is a correspondence shown in Table 11' in which a larger quantity of ports indicates compacter distribution density (that is, a smaller quantity P of frequency domain units at an interval). Certainly, embodiments described herein are not limited to rules of the two correspondences, and these are provided as examples.

TABLE 11'

| Quantity of CSI-RS ports | [1, 2, 4] | [8, 12] | [16, 24] | 32 |
|---|---|---|---|---|
| Distribution density (P) | 7 | 3 | 1 | 0 |

In an implementation, the quantity of CSI-RS ports is indicated by a newly added field or signaling, or is configured by using nrofPorts in CSI-RS-ResourceMapping of RRC signaling.

The correspondence between the CSI-RS port and the quantity of frequency domain unit groups or the distribution density in the foregoing table is used in at least one embodiment. In addition, the quantity of frequency domain unit groups or the distribution density is alternatively indicated by indication information. A relationship between the indication information and the first indication information is not limited in embodiments described herein.

Manner 8:

The first indication information implicitly indicates, by indicating a CSI obtaining solution that is based on angle-delay reciprocity, the frequency domain unit for obtaining the CSI. Optionally, the first indication information is configuration information of a CSI-RS port, or the first indication information indirectly indicates a quantity of CSI-RS ports. In an implementation, according to a protocol, the frequency domain units are fixedly grouped into M groups in response to the first indication information indicating that a current CSI obtaining solution is the CSI obtaining solution is based on the angle-delay reciprocity, and a specific position and distribution density of each frequency domain unit group are agreed. For example, a start position of the first frequency domain unit group is the first frequency domain unit (namely, the frequency domain unit 0 whose index is 0) in the downlink reference signal resource, and a start frequency domain unit of a group other than the first group satisfies a predetermined condition. For example, the predetermined condition is: $(G_i+R_0)$ mod M. For a definition of the predetermined condition, refer to the descriptions in the manner 4. The distribution density of each frequency domain unit group is similar to the example in the foregoing manner, and is expressed as distribution every Q frequency domain units. Optionally, Q=M is denoted as density equal to 1/M.

That the downlink reference signal resource occupies the eight frequency domain units whose indexes are 0 to 7 is still used as an example. Assuming that M=4, in response to the network device configuring the CSI obtaining solution that is based on the angle-delay reciprocity, according to the protocol agreement provided in the foregoing example, the terminal device determines that the start position of the first frequency domain unit group is the first frequency domain unit (the frequency domain unit 0) in the downlink reference signal resource, and that the frequency domain units for obtaining the CSI are grouped into four groups, where the first group occupies the frequency domain units 0 and 4, the second group occupies the frequency domain units 1 and 5, the third group occupies the frequency domain units 2 and 6, and the fourth group occupies the frequency domain units 3 and 7.

In at least one embodiment, distribution density (assumed to be denoted as P, where for a specific meaning, refer to the descriptions in the foregoing other manners) of the frequency domain units is agreed on in a protocol in response to the current CSI obtaining solution being configured by using the first indication information as the CSI obtaining solution that is based on the angle-delay reciprocity, and a start frequency domain unit in the frequency domain units for obtaining the CSI is agreed on. For example, according to the protocol, P=3. In response to the network device indicating, by using the first indication information, the CSI obtaining solution that is based on the angle-delay reciprocity, in response to being is agreed in the protocol that the start position of the frequency domain units is the first frequency domain unit (the frequency domain unit 0) in the downlink reference signal resource, the terminal device determines that the frequency domain units for obtaining the CSI are the frequency domain units 0 and 4. At least one piece of the foregoing content agreed on in the protocol is alternatively indicated by indication information. A relationship between the indication information and the first indication information is not limited in embodiments described herein.

The manner 8 is used in combination with the CSI-RS port and/or the measurement bandwidth. In an implementation, in response to the network device indicating the CSI obtaining solution that is based on the angle-delay reciprocity, and the measurement bandwidth is greater than, equal to, or less than a predetermined value, according to a protocol, the frequency domain units are fixedly grouped into M groups, and a specific position and distribution density of each frequency domain unit group are agreed on. For example, a start frequency domain unit of the first frequency domain unit group is the first frequency domain unit (namely, the frequency domain unit 0 whose index is 0) in the downlink reference signal resource, and a start frequency domain unit of a group other than the first group satisfies a predetermined condition. For example, the predetermined condition is $(G_i+R_0)$ mod M. The distribution density of each frequency domain unit group is 1/M. Alternatively, in response to the network device indicating the CSI obtaining solution is based on the angle-delay reciprocity, and the measurement bandwidth is greater than, equal to, or less than a predetermined value, distribution density (for example, denoted as P) and a start position of the frequency domain units for obtaining the CSI are agreed on in a protocol.

In at least one embodiment, in response to the network device indicating the CSI obtaining solution is based on the angle-delay reciprocity, and the quantity of CSI-RS ports is greater than, equal to, or less than a predetermined value, according to a protocol, the frequency domain units are fixedly grouped into M groups, and a specific position and distribution density of each frequency domain unit group are agreed on. For example, a start frequency domain unit of the first frequency domain unit group is the first frequency domain unit (namely, the frequency domain unit 0 whose index is 0) in the downlink reference signal resource, and a start frequency domain unit of a group other than the first group satisfies a predetermined condition. For example, the predetermined condition is $(G_i+R_0)$ mod M. The distribution density of each frequency domain unit group is 1/M. Alternatively, in response to the network device indicating the CSI obtaining solution is based on the angle-delay reciprocity, and the quantity of CSI-RS ports is greater than, equal to, or less than a predetermined value, distribution density (for example, denoted as P) and a start position of the frequency domain units for obtaining the CSI are agreed on in a protocol.

In at least one embodiment, in response to the network device indicating the CSI obtaining solution is based on the angle-delay reciprocity, the measurement bandwidth is greater than, equal to, or less than a predetermined value, and the quantity of CSI-RS ports is greater than or less than a predetermined value, according to a protocol, the frequency domain units are fixedly grouped into M groups, and a specific position and distribution density of each frequency domain unit group are agreed on. For example, a start position of the first frequency domain unit group is the $0^{th}$ frequency domain unit, and a start frequency domain unit of a group other than the first group satisfies the following predetermined condition: $(G_i+R_0)$ mod M. The distribution density of each frequency domain unit group is 1/M. Alternatively, in response to the network device indicating the CSI obtaining solution is based on the angle-delay reciprocity, the measurement bandwidth is greater than, equal to, or less than a predetermined value, and the quantity of CSI-RS ports is greater than or less than a predetermined value, distribution density P and a start position of the frequency domain units for obtaining the CSI are agreed on in a protocol.

For the foregoing manners 6 to 8, the first indication information includes at least one of the following: indication information indicating the measurement bandwidth, indication information indicating the quantity of CSI-RS ports, or the CSI obtaining solution based on the angle-delay reciprocity. These pieces of indication information is delivered by using one piece of signaling or a plurality of pieces of signaling, and is same indication information or different indication information. In other words, to-be-indicated information is jointly indicated or separately indicated. These pieces of indication information is the first indication information or a part of the first indication information.

In the foregoing manners 6 to 8, the CSI-RS is merely an example of a downlink reference signal. Embodiments described herein are not limited to the CSI-RS, and another reference signal in the downlink reference signal is used.

For the Foregoing Manners 1 to 5:

Optionally, the first indication information is sent by using a newly defined field, or is sent by reusing an existing field. For example, the first indication information is carried in a subband reporting configuration CSI-ReportingBand. Interpretation of different values of the field is redefined, or first several bits of the existing field are used.

The first indication information is delivered by using one piece of signaling, or is delivered by using a plurality of pieces of signaling, to be specific, the second indication information, the third indication information, the fourth indication information, the fifth indication information, the sixth indication information, the seventh indication information, and the eighth indication information that are included in the first indication information are carried in a plurality of pieces of signaling.

The first indication information, the second indication information, the third indication information, the fourth indication information, the fifth indication information, the sixth indication information, the seventh indication information, and the eighth indication information is same indication information or different indication information. In other words, to-be-indicated information is jointly indicated or is separately indicated.

According to at least one embodiment, the network device flexibly configures the CSI measurement based on the system status (for example, the resource utilization or the transmission power), to control obtaining of the CSI. This helps the terminal device obtain the CSI more pertinently based on the indication in different cases.

In the foregoing embodiments, the terminal device and/or the network device performs a part or all of the steps in the embodiments. These steps or operations are merely examples. Other operations or variants of various operations is further performed in embodiments described herein. In addition, the steps is performed in a sequence different from the sequence presented in embodiments, and not all the operations in embodiments described here are performed. Sequence numbers of the steps do not mean execution sequences. The execution sequences of the processes is determined based on functions and internal logic of the processes, and does not constitute any limitation on implementation processes of embodiments described herein.

Figure 4:
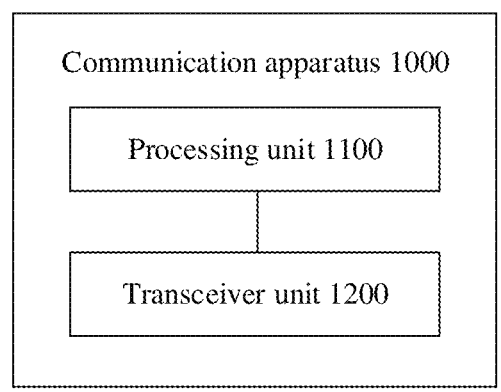
FIG. 4 is a schematic block diagram of a communication apparatus according to at least one embodiment.

FIG. 4 is a schematic block diagram of a communication apparatus according to at least one embodiment. As shown in FIG. 4, the communication apparatus 1000 may include a processing unit 1100 and a transceiver unit 1200.

In at least one embodiment, the communication apparatus 1000 corresponds to the terminal device in the foregoing method, for example, is a terminal device, or is a component (for example, a chip or a chip system) configured in the terminal device.

The communication apparatus 1000 corresponds to the terminal device in the method 200 according to at least one embodiment, and the communication apparatus 1000 includes units configured to perform the method performed by the terminal device in the method 200 in FIG. 2. In addition, the units in the communication apparatus 1000 and the foregoing other operations and/or functions are respectively intended to implement corresponding procedures of the method 200 in FIG. 2.

When the communication apparatus 1000 is configured to perform the method 200 in FIG. 2, the processing unit 1100 is configured to perform step 230 in the method 200, and the transceiver unit 1200 is configured to perform step 220 in the method 200. A specific process in which each unit performs the foregoing corresponding step is described in detail in the foregoing method embodiments. For brevity, details are not described herein again.

In response to the communication apparatus 1000 being the terminal device, the transceiver unit 1200 in the communication apparatus 1000 is implemented by a transceiver, and for example, corresponds to a transceiver 2020 in a terminal device 2000 shown in FIG. 5; and the processing unit 1100 in the communication apparatus 1000 is implemented by at least one processor, and for example, corresponds to a processor 2010 in the terminal device 2000 shown in FIG. 5.

In response to the communication apparatus 1000 being the chip configured in the terminal device, the transceiver unit 1200 in the communication apparatus 1000 is implemented by an input/output interface, and the processing unit 1100 in the communication apparatus 1000 is implemented by a processor, a microprocessor, an integrated circuit, or the like integrated in the chip or the chip system.

In at least one embodiment, the communication apparatus 1000 corresponds to the network device in the foregoing method embodiments, for example, is a network device, or is a component (for example, a chip or a chip system) configured in the network device.

The communication apparatus 1000 corresponds to the network device in the method 200 according to at least one embodiment, and the communication apparatus 1000 includes units configured to perform the method performed by the network device in the method 200 in FIG. 2. In addition, the units in the communication apparatus 1000 and the foregoing other operations and/or functions are respectively intended to implement corresponding procedures of the method 200 in FIG. 2.

When the communication apparatus 1000 is configured to perform the method 200 in FIG. 2, the processing unit 1100 is configured to perform step 210 in the method 200, and the transceiver unit 1200 is configured to perform step 220 in the method 200. A specific process in which each unit performs the foregoing corresponding step is described in detail in the foregoing method embodiments. For brevity, details are not described herein again.

Figure 6:
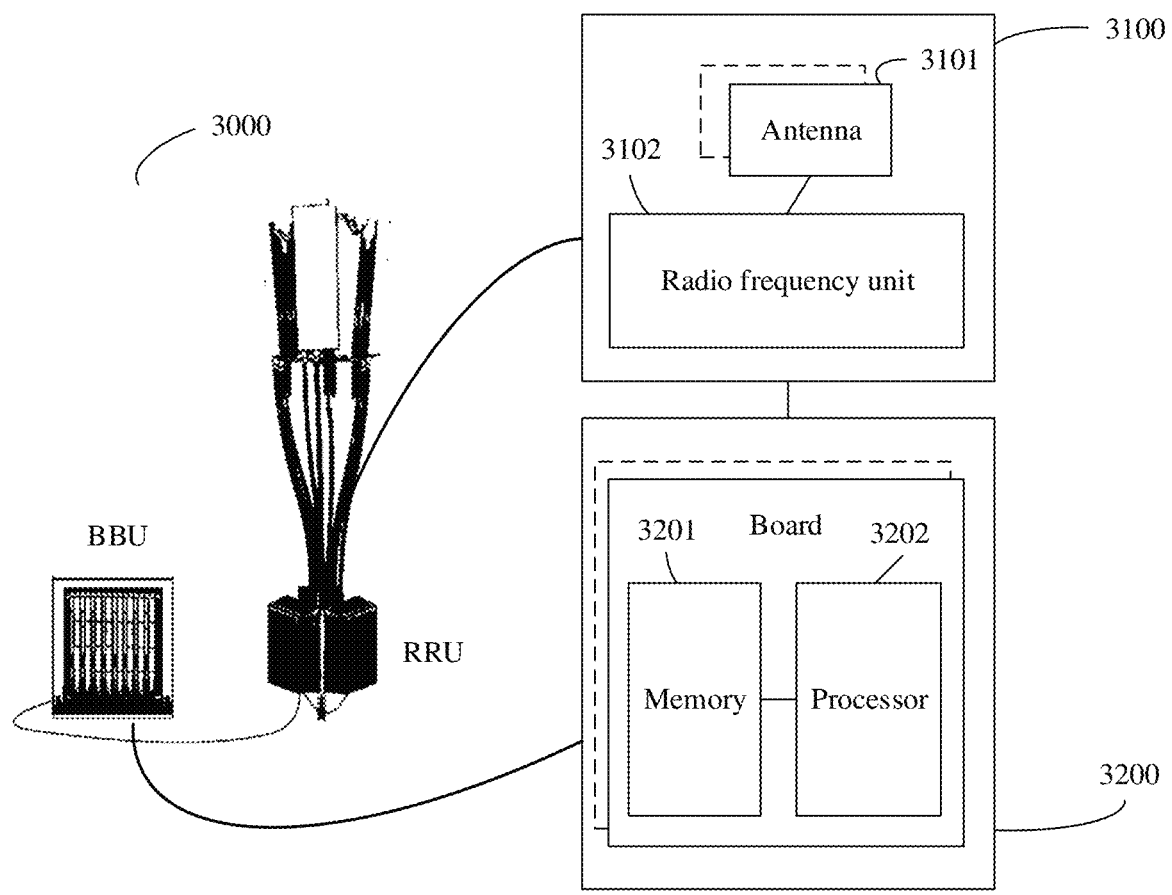
FIG. 6 is a schematic diagram of a structure of a network device according to at least one embodiment.

In response to the communication apparatus 1000 being the network device, the transceiver unit in the communication apparatus 1000 is implemented by a transceiver, and for example, corresponds to a transceiver 3100 in a network device 3000 shown in FIG. 6; and the processing unit 1100 in the communication apparatus 1000 is implemented by at least one processor, and for example, corresponds to a processor 3200 in the network device 3000 shown in FIG. 6.

In response to the communication apparatus 1000 being the chip configured in the network device, the transceiver unit 1200 in the communication apparatus 1000 is implemented by an input/output interface, and the processing unit 1100 in the communication apparatus 1000 is implemented by a processor, a microprocessor, an integrated circuit, or the like integrated in the chip or the chip system.

FIG. 5 is a schematic diagram of a structure of a terminal device 2000 according to at least one embodiment. The terminal device 2000 is used in the system shown in FIG. 1, and perform functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2002, and the memory 2030 communicates with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 further includes an antenna 2040, configured to send, by using a radio signal, uplink data or uplink control signaling output by the transceiver 2020.

The processor 2010 and the memory 2030 is integrated into one processing apparatus. The processor 2010 is configured to execute program code stored in the memory 2030, to implement the foregoing function. During specific implementation, the memory 2030 is alternatively integrated into the processor 2010, or is independent of the processor 2010. The processor 2010 corresponds to the processing unit 1100 in FIG. 4.

The transceiver 2020 corresponds to the transceiver unit 1200 in FIG. 4. The transceiver 2020 includes a receiver (or referred to as a receiver circuit) and a transmitter (or referred to as a transmitter circuit). The receiver is configured to receive a signal, and the transmitter is configured to transmit a signal.

The terminal device 2000 shown in FIG. 5 implements each process performed by the terminal device in the method embodiment shown in FIG. 2. The operations and/or the functions of the modules in the terminal device 2000 are respectively used to implement the corresponding procedures in the foregoing method embodiments. For details, refer to the descriptions in the foregoing method embodiments. To avoid repetition, detailed descriptions are properly omitted herein.

The processor 2010 is configured to perform an action that is implemented inside the terminal device and that is described in the foregoing method embodiments, for example, control of another component by the terminal device (for example, control of the transceiver 2020). The transceiver 2020 is configured to perform an action of receiving from or sending to the network device by the terminal device that is described in the foregoing method embodiments. For details, refer to the descriptions in the foregoing method embodiments. The details are not described herein again.

Optionally, the terminal device 2000 further includes a power supply 2050, configured to supply power to various components or circuits in the terminal device.

In addition, to improve the functions of the terminal device, the terminal device 2000 further includes one or more of an input unit 2060, a display unit 2070, an audio circuit 2080, a camera 2090, a sensor 2100, and the like, and the audio circuit further includes a speaker 2082, a microphone 2084, and the like.

FIG. 6 is a schematic diagram of a structure of a network device according to at least one embodiment, for example, is a schematic diagram of a structure of a base station. The base station 3000 is used in the system shown in FIG. 1, and perform functions of the network device in the foregoing method embodiments. As shown in the figure, the base station 3000 includes one or more radio frequency units, for example, one or more remote radio units (remote radio units, RRUs) 3100, and one or more baseband units (BBUs) (which is also referred to as distributed units (DUs)) 3200. The RRU 3100 is referred to as a transceiver unit, and correspond to the transceiver unit 1200 in FIG. 4. Optionally, the transceiver unit 3100 is also referred to as a transceiver, a transceiver circuit, or the like, and includes at least one antenna 3101 and a radio frequency unit 3102. Optionally, the transceiver unit 3100 includes a receiving unit and a sending unit. The receiving unit corresponds to a receiver (or referred to as a receiver circuit), and the sending unit corresponds to a transmitter (or referred to as a transmitter circuit). The RRU 3100 is mainly configured to: send and receive a radio frequency signal, and perform conversion between the radio frequency signal and a baseband signal. For example, the RRU 3100 is configured to send indication information to a terminal device. The BBU 3200 part is mainly configured to: perform baseband processing, control the base station, and so on. The RRU 3100 and the BBU 3200 is physically configured together, or is physically configured separately, in other words, in a distributed base station.

The BBU 3200 is a control center of the base station, and is also referred to as a processing unit. The BBU 3200 corresponds to the processing unit 1100 in FIG. 4, and is mainly configured to implement a baseband processing function, for example, channel coding, multiplexing, modulation, or spreading. For example, the BBU (the processing unit) is configured to control the base station to perform an operation procedure related to the network device in the foregoing method embodiments, for example, generate the foregoing indication information.

In an example, the BBU 3200 includes one or more boards, and a plurality of boards jointly support a radio access network (such as an LTE network) having a single access standard, or separately support radio access networks (for example, an LTE network, a 5G network, or another network) having different access standards. The BBU 3200 further includes a memory 3201 and a processor 3202. The memory 3201 is configured to store instructions and data. The processor 3202 is configured to control the base station to perform an action, for example, configured to control the base station to perform the operation procedure related to the network device in the foregoing method embodiments. The memory 3201 and the processor 3202 serve one or more boards. In other words, a memory and a processor are configured on each board. Alternatively, a plurality of boards share a same memory and a same processor. In addition, a circuit is further configured on each board.

The base station 3000 shown in FIG. 6 implements each process performed by the network device in the method embodiment shown in FIG. 2. The operations and/or the functions of the modules in the base station 3000 are respectively used to implement the corresponding procedures in the foregoing method embodiments. For details, refer to the descriptions in the foregoing method embodiments. To avoid repetition, detailed descriptions are properly omitted herein.

The BBU 3200 is configured to perform an action that is implemented inside the network device and that is described in the foregoing method embodiments, and the RRU 3100 is configured to perform an action of sending to or receiving from the terminal device by the network device that is described in the foregoing method embodiments. For details, refer to the descriptions in the foregoing method embodiments. The details are not described herein again.

The base station 3000 shown in FIG. 6 is a form of the network device, but does not constitute any limitation of embodiment described herein. The method provided in at least one embodiment is applicable to a network device in another form. For example, the network device includes an AAU, and further includes a CU and/or a DU; includes a BBU and an adaptive radio unit (adaptive radio unit, ARU); or includes a BBU. Alternatively, the network device is customer premises equipment (customer premises equipment, CPE), or is in another form. A specific form of the network device is not limited in embodiments described herein.

The CU and/or the DU is configured to perform an action that is implemented inside the network device and that is described in the foregoing method embodiments, and the AAU is configured to perform an action of sending to or receiving from the terminal device by the network device that is described in the foregoing method embodiments. For details, refer to the descriptions in the foregoing method embodiments. The details are not described herein again.

At least one embodiment further provides a processing apparatus, including a processor and an interface. The processor is configured to perform the method in any one of the foregoing method embodiments.

The processing apparatus is one or more chips. For example, the processing apparatus is a field programmable gate array (field programmable gate array, FPGA), an application-specific integrated circuit (application-specific integrated circuit, ASIC), a system on a chip (system on a chip, SoC), a central processing unit (central processing unit, CPU), a network processor (network processor, NP), a digital signal processor (digital signal processor, DSP), a microcontroller unit (microcontroller unit, MCU), a programmable logic device (programmable logic device, PLD), or another integrated chip.

In an implementation process, the steps in the foregoing methods is implemented by using a hardware integrated logic circuit in the processor, or by using instructions in a form of software. The steps of the methods disclosed with reference to at least one embodiment is directly performed by a hardware processor, or is performed by a combination of hardware in the processor and a software module. The software module is located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

The processor in at least one embodiment is an integrated circuit chip, and has a signal processing capability. In an implementation process, the steps in the foregoing method embodiments is implemented by using a hardware integrated logic circuit in the processor, or by using instructions in a form of software. The processor is a general-purpose processor, a digital signal processor (DSP), an application-specific integrated circuit (ASIC), a field programmable gate array (FPGA) or another programmable logic device, a discrete gate or a transistor logic device, or a discrete hardware component. The processor implements or performs the methods, the steps, and logical block diagrams that are disclosed in at least one embodiment. The general-purpose processor is a microprocessor, or the processor is any conventional processor or the like. The steps of the methods disclosed with reference to at least one embodiment is directly performed by a hardware decoding processor, or is performed by a combination of hardware in the decoding processor and a software module. The software module is located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in at least one embodiment is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. By way of example but not limitation, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). The memory in the system and method described in this specification includes but is not limited to these memories and any memory of another proper type.

According to the method provided in at least one embodiment, a computer program product is provided. The computer program product includes computer program code. In response to the computer program code being run on a computer, the computer is enabled to perform the methods separately performed by the terminal device and the network device in the embodiment shown in FIG. 2.

According to the method provided in at least one embodiment, a computer-readable medium is provided. The computer-readable medium stores program code. In response to the program code being run on a computer, the computer is enabled to perform the methods separately performed by the terminal device and the network device in the embodiment shown in FIG. 2.

According to the method provided in at least one embodiment, a system is provided, including one or more terminal devices and one or more network devices above.

The network device and the terminal device in the foregoing apparatus embodiments completely correspond to the network device and the terminal device in the method embodiments. A corresponding module or unit performs a corresponding step. For example, a communication unit (the transceiver) performs a receiving or sending step in the method embodiments, and a step other than the sending step and the receiving step is performed by the processing unit (the processor). For a function of a specific unit, refer to the corresponding method embodiment. There is one or more processors.

Terms such as "component", "module", and "system" used in this specification indicate computer-related entities, hardware, firmware, combinations of hardware and software, software, or software being executed. For example, a component is, but is not limited to, a process that runs on a processor, a processor, an object, an executable file, an execution thread, a program, and/or a computer. As illustrated in figures, both a computing device and an application that runs on the computing device is components. One or more components reside in a process and/or an execution thread, and a component is located on one computer and/or distributed between two or more computers. In addition, these components is executed from various computer-readable media that store various data structures. For example, the components communicate by using a local process and/or a remote process according to, for example, a signal having one or more data packets (for example, data from two components interacting with another component in a local system or a distributed system and/or across a network such as the Internet interacting with another system by using a signal).

A person of ordinary skill in the art is aware that, various illustrative logical blocks (illustrative logical blocks) and steps (steps) described with reference to embodiments disclosed in this specification is implemented by electronic hardware or a combination of computer software and electronic hardware. Whether the functions are performed by hardware or software depends on particular applications and design constraints of the technical solutions. A person skilled in the art is able to use a different method to implement the described functions for at least one embodiment, but embodiments described herein do not go beyond the scope of the description made herein.

A person skilled in the art understands that, for the purpose of convenient and brief description, for a detailed working process of the foregoing system, apparatus, and unit, refer to a corresponding process in the foregoing method embodiments, and details are not described herein again.

In at least one embodiment, the disclosed system, apparatus, and method are implemented in other manners. For example, the described apparatus embodiment is merely an example. For example, division into the units is merely logical function division and is other division during actual implementation. For example, a plurality of units or components are combined or integrated into another system, or some features are ignored or not performed. In addition, the displayed or discussed mutual couplings or direct couplings or communication connections are implemented by using some interfaces. The indirect couplings or communication connections between the apparatuses or units are implemented in an electronic form, a mechanical form, or other forms.

The units described as separate parts are or are not physically separate, and parts displayed as units are or are not physical units, in other words, are located in one position, or are distributed on a plurality of network units. Some or all of the units are selected based on actual use that achieves the objectives of the solutions of embodiments.

In addition, functional units in at least one embodiment are integrated into one processing unit, each of the units may exist alone physically, or two or more units are integrated into one unit.

In the foregoing embodiments, all or some of the functions of the functional units are implemented by software, hardware, firmware, or any combination thereof. In response to software being used to implement the functions, all or a part of the functions are implemented in a form of a computer program product. The computer program product includes one or more computer instructions (programs). In response to the computer program instructions (programs) being loaded and executed on a computer, the procedures or functions according to at least one embodiment are all or partially generated. The computer is a general-purpose computer, a special-purpose computer, a computer network, or another programmable apparatus. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device, such as a server or a data center, integrating one or more usable media. The usable medium is a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

When the functions are implemented in a form of a software functional unit and sold or used as an independent product, the functions are stored in a computer-readable storage medium. Based on such an understanding, the technical solutions of at least one embodiment, or the part contributing to the prior art, or some of the technical solutions are implemented in a form of a software product. The computer software product is stored in a storage medium, and includes several instructions for instructing a computer device (which is a personal computer, a server, a network device, or the like) to perform all or some of the steps of the methods described in at least one embodiment. The foregoing storage medium includes any medium that stores program code, such as a USB flash drive, a removable hard disk, a read-only memory (read-only memory, ROM), a random access memory (random access memory, RAM), a magnetic disk, or an optical disc.

The foregoing descriptions are merely specific implementations of embodiments, but are not intended to limit the protection scope of embodiments described herein. Any variation or replacement readily figured out by a person skilled in the art within the technical scope falls within the protection scope of embodiments described herein. Therefore, the protection scope of embodiments described here is subject to the protection scope of the claims.

What is claimed is:

1. A method for indicating channel state information (CSI) measurement, wherein the method comprises:
   receiving, at a terminal device, first indication information from a network device, wherein the first indication information indicates one or more frequency domain units in a downlink reference signal resource that are used by the terminal device to obtain CSI, and the first indication information comprises:
      second indication information indicating a start frequency domain unit in the frequency domain units; and
      third indication information indicating a distribution density of the frequency domain units in the downlink reference signal resource; and
   performing, by the terminal device, measurement in the frequency domain unit based on the first indication information to obtain the CSI.

2. The method according to claim 1, wherein the distribution density is an interval of P frequency domain units, wherein P is an integer greater than or equal to 0.

3. The method according to claim 1, wherein the first indication information further comprises:
   fourth indication information indicating a quantity of frequency domain unit groups into which the frequency domain units are grouped.

4. The method according to claim 3, wherein the frequency domain unit groups correspond to different downlink reference signal ports, wherein a correspondence between the frequency domain unit groups and the different downlink reference signal ports is indicated by fifth indication information included in the first indication information.

5. An apparatus for indicating channel state information (CSI) measurement, wherein the apparatus comprises:
   at least one processor, and one or more memories coupled to the at least one processor and storing programming instructions for execution by the at least one processor to perform operations comprising:
   receiving, at the processor, first indication information from a network device, wherein the first indication information indicates one or more frequency domain units in a downlink reference signal resource that are used by the processor to obtain CSI, and the first indication information comprises:
      second indication information indicating a start frequency domain unit in the frequency domain units; and
      third indication information indicating a distribution density of the frequency domain units in the downlink reference signal resource; and
   performing measurement in the frequency domain unit based on the first indication information to obtain the CSI.

6. The apparatus according to claim 5, wherein the distribution density is an interval of P frequency domain units, wherein P is an integer greater than or equal to 0.

7. The apparatus according to claim 5, wherein the first indication information further includes:
   fourth indication information, indicating a quantity of frequency domain unit groups into which the frequency domain units are grouped.

8. The apparatus according to claim 7, wherein the frequency domain unit groups correspond to different downlink reference signal ports, and a correspondence between the frequency domain unit groups and the different downlink reference signal ports is indicated by fifth indication information included in the first indication information.

9. The apparatus according to claim 8, wherein the first indication information further includes:
   sixth indication information, indicating a start frequency domain unit of a first group in the frequency domain unit groups.

10. An apparatus for indicating channel state information (CSI) measurement, wherein the apparatus comprises:
    at least one processor, and one or more memories coupled to the at least one processor and storing programming instructions for execution by the at least one processor to perform operations comprising:
    generating, by the processor, first indication information, wherein the first indication information indicates one or more frequency domain units in a downlink reference signal resource that are used to obtain CSI, and the first indication information comprises:
       second indication information indicating a start frequency domain unit in the frequency domain units; and
       third indication information indicating a distribution density of the frequency domain units in the downlink reference signal resource; and
    sending, by the processor, the first indication information.

11. The apparatus according to claim 10, wherein the distribution density is an interval of P frequency domain units, wherein P is an integer greater than or equal to 0.

12. The apparatus according to claim 10, wherein the first indication information further includes:
    fourth indication information, indicating a quantity of frequency domain unit groups into which the frequency domain units are grouped.

13. The apparatus according to claim 12, wherein the frequency domain unit groups correspond to different downlink reference signal ports, and a correspondence between the frequency domain unit groups and the different downlink reference signal ports is indicated by fifth indication information included in the first indication information.

14. The apparatus according to claim 13, wherein the first indication information further includes:
    sixth indication information, indicating a start frequency domain unit of a first group in the frequency domain unit groups.

15. The apparatus according to claim 12, wherein the frequency domain unit groups correspond to different downlink reference signal ports, and a correspondence between the frequency domain unit groups and the different downlink reference signal ports is preset.

16. The method according to claim 1, wherein the second indication information and the third indication information are indicated jointly.

17. The method according to claim 3, wherein the frequency domain unit groups correspond to different downlink reference signal ports, wherein a correspondence between the frequency domain unit groups and the different downlink reference signal ports is preset.

18. The method according to claim 4, wherein the first indication information further includes:
   sixth indication information, indicating a start frequency domain unit of a first group in the frequency domain unit groups.

19. The apparatus according to claim 5, wherein the second indication information and the third indication information are indicated jointly.

20. The apparatus according to claim 7, wherein the frequency domain unit groups correspond to different downlink reference signal ports, and a correspondence between the frequency domain unit groups and the different downlink reference signal ports is preset.

* * * * *

UNITED STATES PATENT AND TRADEMARK OFFICE
CERTIFICATE OF CORRECTION

| | |
|---|---|
| PATENT NO. | : 12,376,091 B2 |
| APPLICATION NO. | : 17/941430 |
| DATED | : July 29, 2025 |
| INVENTOR(S) | : Shibin Ge et al. |

Page 1 of 1

It is certified that error appears in the above-identified patent and that said Letters Patent is hereby corrected as shown below:

In the Specification

Column 17, Line 47-57 should be replaced with:
In an FDD mode, because of reciprocity between delays and angles of uplink and downlink channels, a space-frequency matrix $\mathbf{H}_{UL}$ obtained through uplink channel measurement is expressed as $\mathbf{H}_{UL} = \mathbf{S}\mathbf{C}_{UL}\mathbf{F}^H$, and a space-frequency matrix $\mathbf{H}_{DL}$ obtained through downlink channel measurement is expressed as $\mathbf{H}_{DL} = \mathbf{S}\mathbf{C}_{DL}\mathbf{F}^H$. Therefore, in at least one embodiment, a coefficient matrix $\mathbf{C}_{DL}$ corresponding to the downlink channel is determined through the downlink channel measurement and is fed back, to determine a precoding matrix that adapts to the downlink channel.

Signed and Sealed this
Twenty-eighth Day of October, 2025

John A. Squires
*Director of the United States Patent and Trademark Office*